United States Patent [19]
Ketterer, deceased et al.

[11] Patent Number: 5,378,018
[45] Date of Patent: Jan. 3, 1995

[54] PROCESS FOR INFLATING A GAS CUSHION AND SAFETY SYSTEM OF THE AIR BAG TYPE

[76] Inventors: Dieter Ketterer, deceased, Oberndorf am Necker; Ketterer Brigitte, Schlehenweg 1, 7238 Oberndof am Neckar; Raimund Fritz, Raichsbergweg 2, 7218 Trossingen; Heinz Seeger, Gartenstrasse 19, 7204 Schopfloch; Ralf Conzelmann, Schumarkplatz 3, 7238 Oberndorf am Neckar; Michael Schumacher, Ob der Sulzhaide 18, 7238 Oberndorf am Neckar; Tilo Moeller, Ob der Sulzhaide 24, 7238 Oberndorf am Neckar, all of Germany

[21] Appl. No.: 768,914
[22] PCT Filed: Jan. 29, 1991
[86] PCT No.: PCT/EP91/00166
  § 371 Date: Jan. 5, 1993
  § 102(e) Date: Jan. 5, 1993
[87] PCT Pub. No.: WO91/11347
  PCT Pub. Date: Aug. 8, 1991

[30] Foreign Application Priority Data
Jan. 30, 1990 [DE] Germany .............. 4002662

[51] Int. Cl.⁶ .............................. B60R 21/26
[52] U.S. Cl. ...................... 280/737; 222/5; 422/165
[58] Field of Search ......... 280/736, 737, 741, 742, 280/728 R; 422/164, 165, 166; 102/530, 531; 222/3, 5

[56] References Cited

U.S. PATENT DOCUMENTS

| | | | |
|---|---|---|---|
| Re. 29,228 | 5/1977 | Hass | 280/738 |
| 3,692,495 | 9/1972 | Schneiter | 280/741 |
| 3,905,515 | 9/1975 | Allemann | 222/5 |
| 3,909,037 | 9/1975 | Stewart | 280/738 |
| 3,966,228 | 6/1976 | Neuman | 280/737 |
| 3,968,980 | 7/1976 | Hay | 280/737 |
| 3,985,375 | 10/1976 | Lewis et al. | 280/741 |
| 4,131,300 | 12/1978 | Radke | 280/737 |
| 4,275,901 | 6/1981 | Okada | 280/737 |
| 4,825,764 | 5/1989 | Jullien | 102/202.14 |
| 4,959,011 | 9/1990 | Nilsson | 102/202.9 |

FOREIGN PATENT DOCUMENTS 2443267  3/1975  Germany .................. 280/741

Primary Examiner—Karin L. Tyson
Attorney, Agent, or Firm—Egli International

[57] ABSTRACT

The invention related to a process for quickly inflating a gas cushion in a safety system of the air bag type in which at least two pressurized filling gases are stored being shielded from each other. Instead of the filling gases, initially only the starting material(s) of one or both filling gases can be stored. In case of need, for instance upon a crash-characteristic signal, the filling gases are released from their reservoirs; if necessary, the starting material(s) of one or more filling gases is/are first ignited due to the crash-characteristic signal and then produce(s) the filling gas. The released filling gases are then concentrated and finally inflate the gas cushion or air bag.

29 Claims, 14 Drawing Sheets

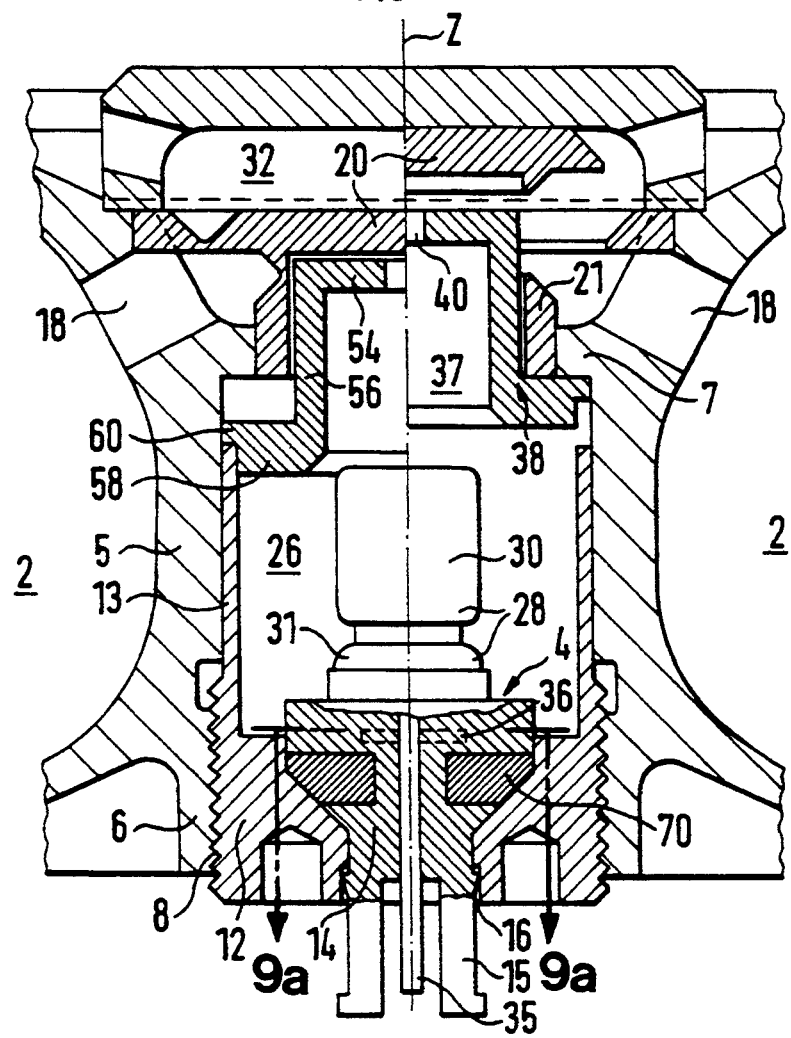
FIG. 9
FIG. 9a
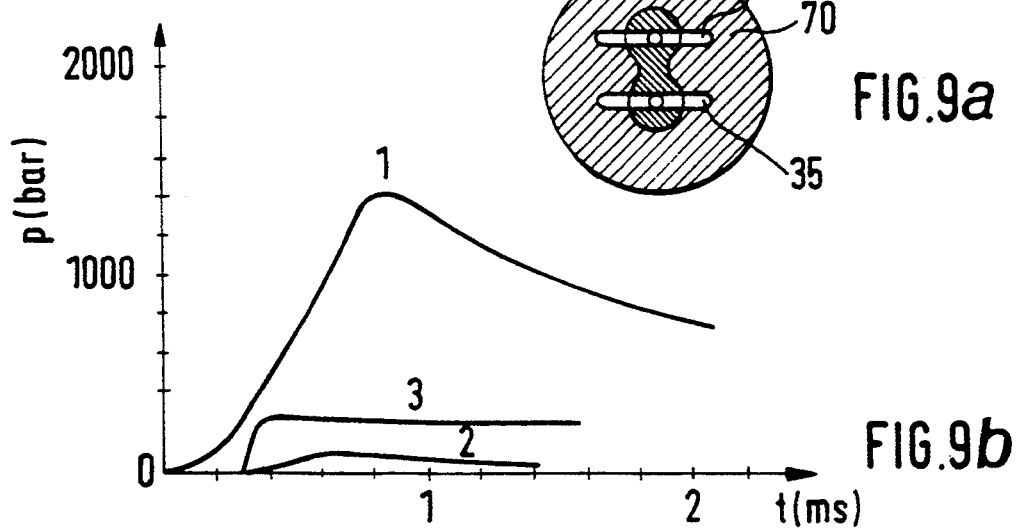
FIG. 9b

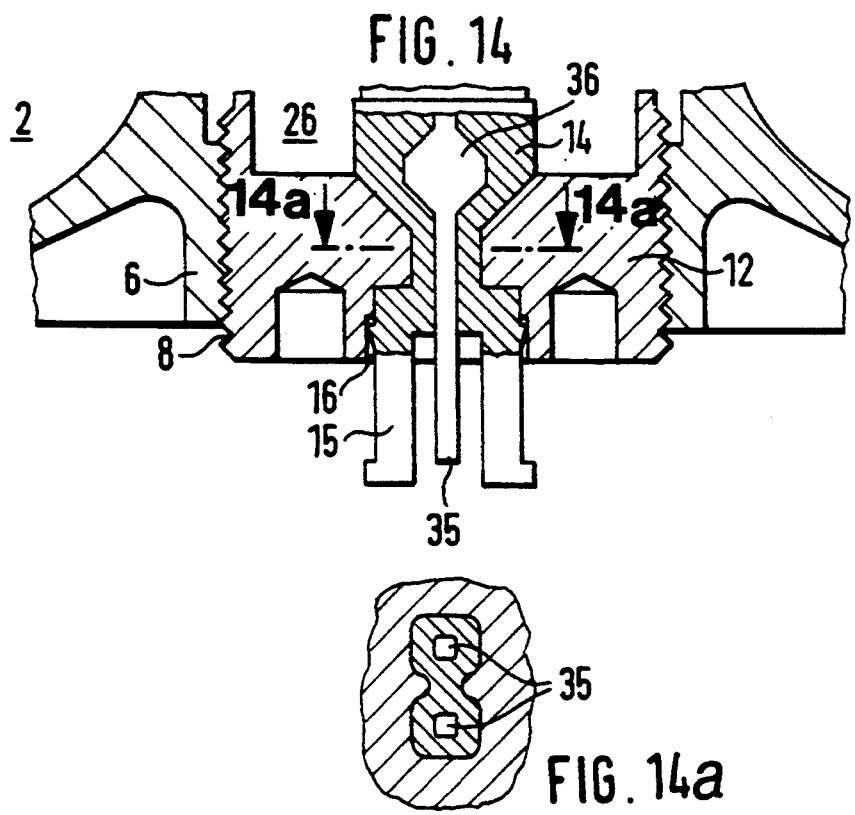
FIG. 14
FIG. 14a
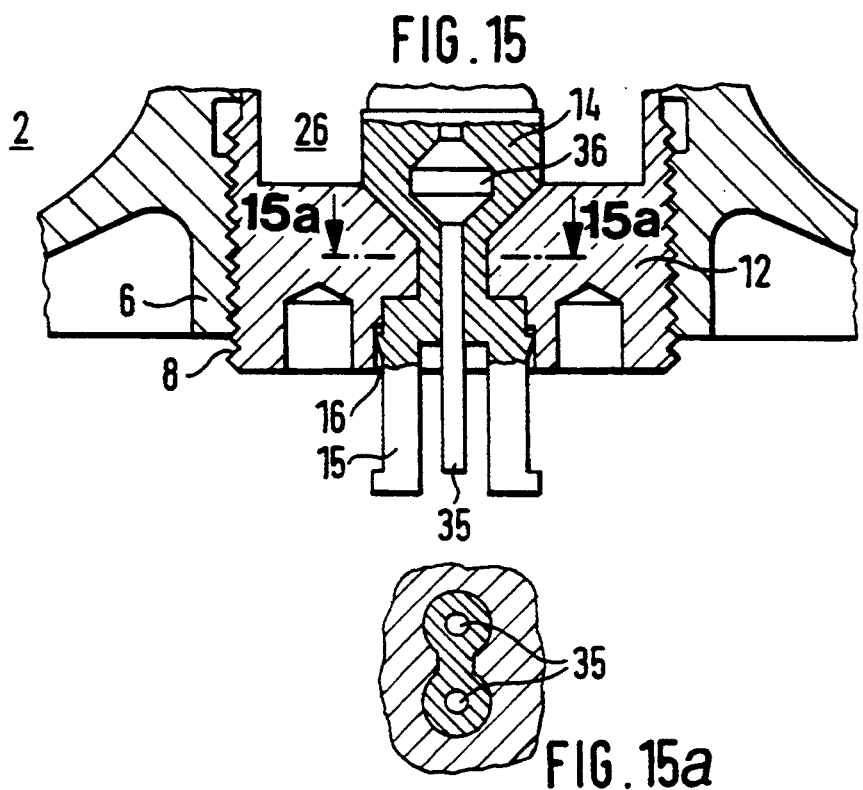
FIG. 15
FIG. 15a

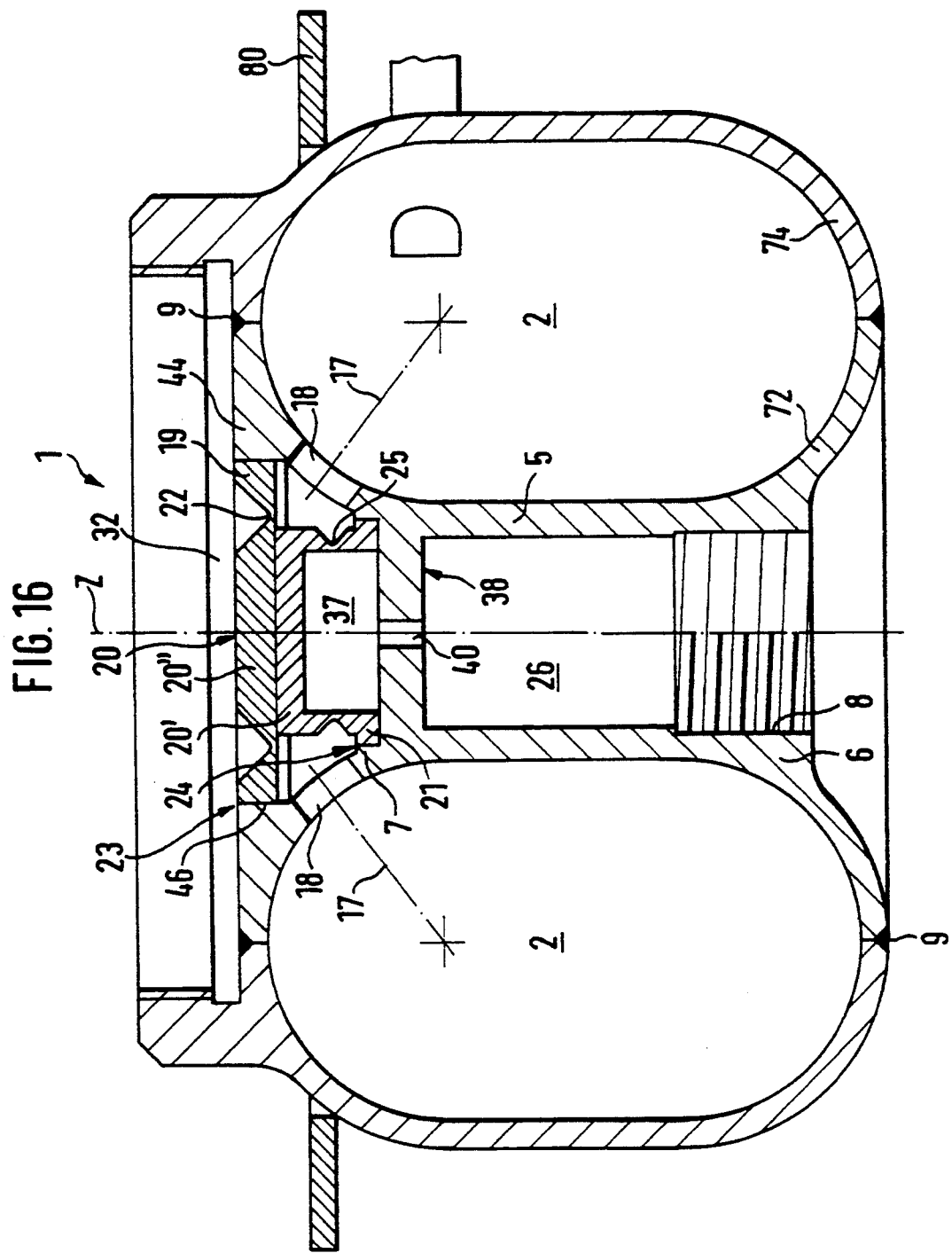

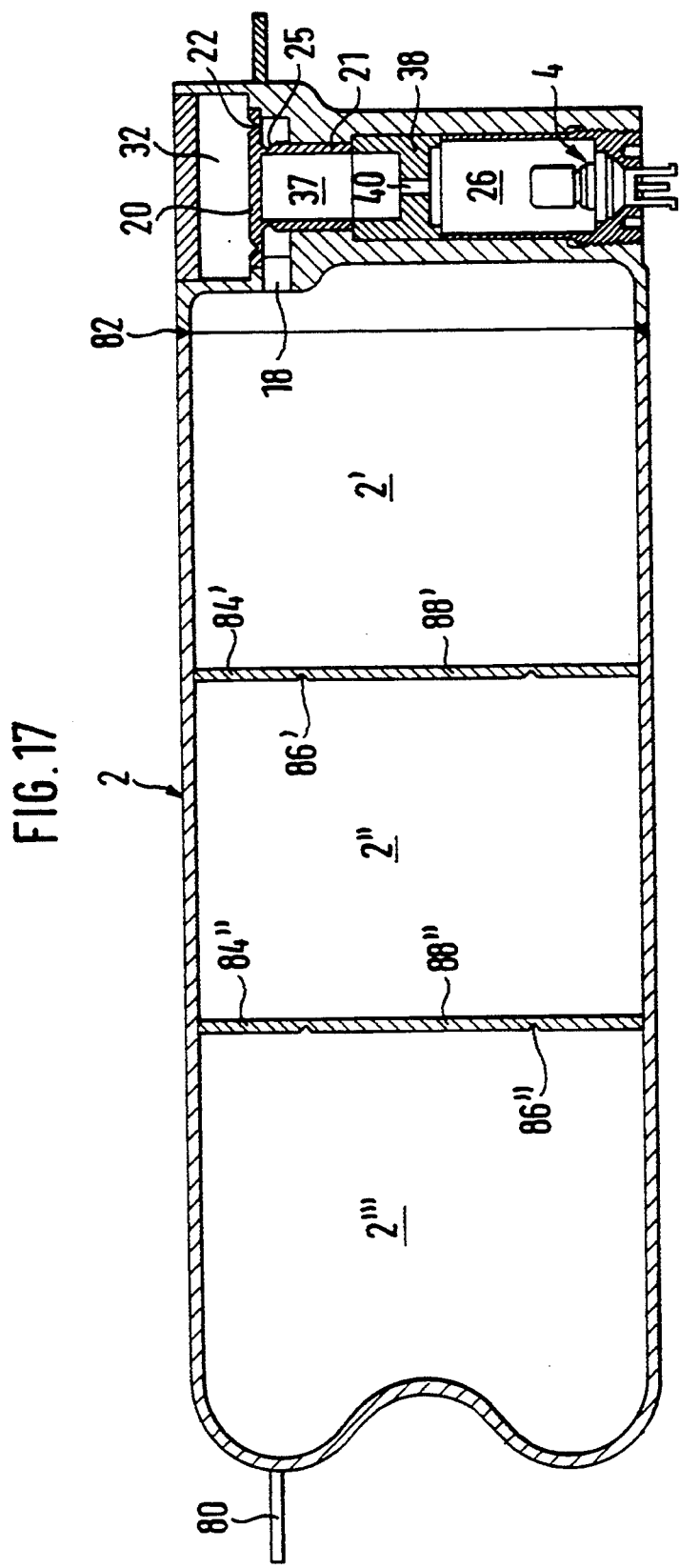

PROCESS FOR INFLATING A GAS CUSHION AND SAFETY SYSTEM OF THE AIR BAG TYPE

The invention relates to a process for quickly inflating a gas cushion in a safety system of the air bag type in which at least two pressurized filling gases are stored being shielded from each other. Instead of the filling gases, initially only the starting material(s) of one or both filling gases can be stored. In case of need, for instance upon a crash-characteristic signal, the filling gases are released from their reservoirs; if necessary, the starting material(s) of one or more filling gases is/are first ignited due to the crash-characteristic signal and then produce(s) the filling gas. The released filling gases are then concentrated and finally inflate the gas cushion or air bag (generic title of claim 1).

The invention also relates to a safety system comprising a gas cushion of the air bag type which is quickly inflatable if need be, for instance in the above-mentioned case of crash, in particular for carrying out the aforementioned process. The safety system comprises at least two pressure tanks, each storing a pressurized filling gas or possibly at first only the starting material(s) thereof. In addition, in the case of crash gas outlets adapted to be forced open are provided to release and concentrate the filling gases. If, instead of the filling gases, only the starting materials thereof are stored, they are initially ignited in the case of crash to produce the filling gases (generic title of claim 10).

Safety systems of the air bag type are generally adapted to be used, also within the present invention, for inflatable life vests, life-boats, signal balloons or the like. They are known in particular as so-called passive safety systems for motor vehicles, for example from DE-PS 21 18 817 as well as DE-OS 21 18 816, DE-OS 21 31 902, DE-OS 21 43 165, DE-OS 21 43 166 and DE-OS 22 37 461 filed by the applicants.

A gas cushion, also referred to as air bag, is generally spoken a flexible, bag-like envelope which can be inflated very quickly in the case of accident. In motor vehicles an air bag safety system is intended to inflate the air bag very quickly in the case of accident and to position the inflated air bag between the driver and the steering wheel (driver system) or between a passenger and the dashboard or other parts of the vehicle body (front passenger system). Hereby the passengers of the vehicle are to be received softly in the case of accident. It is a substantial requirement of such a safety system that the air bag must be inflated quickly, for instance within 30 ms. After inflation the air bag is regularly deflated into the passenger compartment again.

Safety systems which operate exclusively on the basis of solid matter generators, as they are called, are known. In that case, a pyrotechnical charge, for instance sodium azide ($NaN_3$) is ignited and then burns off rapidly, while combustion gases are developed. The combustion gases, also referred to as generator gas, have a temperature of about 1200° C. They are used to inflate the air bag.

Pure solid matter generator systems have drawbacks. The hot combustion gases require a special configuration of the air bag so that it is adapted to resist the high temperatures. Herefor the air bag is provided at its inside with a temperature-resistant rubber coating to protect the air bag from thermal destruction. Moreover, the rubber coating acts as an insulating layer to prevent the person to be received by the air bag from suffering burns. In order to keep the rubber coating of the air bag soft and operative, the surface thereof is powdered with talcum. When inflating the air bag, the talcum is swirled up and escapes together with the hot combustion gases into the passenger compartment, when the air bag is deflated. As a consequence, the driver's visibility is obstructed. This may result in a so-called secondary crash.

It is a substantial further drawback of solid matter generator systems that only a 60 to 70% combustion of the pyrotechnic charge takes place. The unburnt residue is discharged with the combustion gases from the solid matter generator. It does not only contains a high content of toxic substances, such as nitrogen oxides, carbon monoxide and the like. The unburnt parts of the sodium azide charge likewise form toxic substances together with water or body fluid, for instance hydrocyanic acid (HCN). The air bag discharges these gases and reaction products, resp., into the passenger compartment. This can lead to the fact that the passengers in the vehicle do survive the accident, to be sure, but not the above-mentioned sequels.

Finally, the disposal of the unburnt sodium azide content is a great problem. This substance and the reaction products thereof are toxic and can even be utilized as an explosive. Consequently, there is the risk of an abusive further exploitation of the unburnt sodium azide content. If about 300 g are required for each vehicle (100 g per driver, 200 g per passenger), about 30 million kg (30,000 tons) of toxic sodium azide adapted to be used as explosive are resulting—with an estimated number of 100 million motor vehicles. Assuming an average life of about 8 years per car, about 3,750 tons of sodium azide would have to be disposed of and recycled every year.

To avoid these drawbacks, one has attempted to replace the solid matter generator by a pressure gas tank storing the gas which inflates the air bag as pressure gas. Pressure gas generators of that kind are described in the applicants' above-quoted publications. To make things easier, reference can be made thereto.

A problem of the pressure gas generators consists in the fact that, when opening the pressure gas tank, the pressure gas is suddenly strongly relieved and is allowed to cool down to about minus 50° C. and more. Hereby a humidity possibly contained in the gas is allowed to condense out. If foreign air is sucked in during inflation of the air bag, also the humidity contained in the foreign air is allowed to condense out in addition. In the case of unfavourable external temperatures, mist may form in the passenger compartment. The abrupt reduction of the pressure gas temperature also strongly cools down the air bag itself and reduces the volume of the relieved gas. Therefore the volume of the compressed gas must be selected to be appropriately large, which entails large pressure tanks. This results in considerable constructional problems.

As is known, one has attempted to cope with the problems of generator gas safety systems and those of pressure gas safety systems by hybrid systems, as they are called. Such a system is known from U.S. Pat. No. 4,131,300. There a toroidal pressure gas chamber surrounds a propelling charge chamber disposed in the central hole of the torus. The pressure gas chamber and the propelling charge chamber are separated from each other by a bursting membrane. Upon a crash-characteristic signal, at first said bursting membrane is forced open. The power gas then penetrates the pressure gas chamber and mixes with the pressure gas to form a hybrid gas. After a sufficient heating and a pressure increase, the hybrid gas finally forces open a second bursting membrane shielding the pressure gas tank from the outside and then flows through a diffusor into the air bag. The quoted publication also mentions the following possibility: the flow speed of the power gas can be increased by a small opening in the first bursting membrane. Hereby a better directivity is imparted to the power gas. However, the power gas must constantly flow through the pressure gas tank and mix with the pressure gas to form a hybrid gas, before it forces the second bursting membrane open. Thus pressure peaks of the power gas are directly transferred to the pressure gas tank. Therefore the latter must be pressure-stable. Moreover, there may occur undesired interactions between the pressure gas and the power gas inside the pressure gas tank.

DE-OS 23 48 834 likewise shows a hybrid system for inflating an air bag. In this hybrid system the pressure, the temperature and the flow speed of a stored pressure gas are increased by the addition of heat in the known way. The heat is supplied by two propelling charges shielded from the pressure gas including their priming caps. They are ignited simultaneously or staggered in time depending on the situation of the accident. The power gases produced hereby constantly flow into the pressure gas tank, are concentrated there with the pressure gas to form a hybrid gas which forces open a further bursting seal and finally flows into the air bag. Here, too, the same problems as in the case of U.S. Pat. No. 4,131,300 are arising.

From DE-OS 24 06 645 another (two-step) hybrid system is known in which a bursting membrane shields the power gas gas chamber from the pressure gas chamber. A further bursting membrane shields the pressure gas chamber from the diffusor. Both bursting membranes are connected with each other by a movable rod. Upon transmission of a crash-characteristic signal, the bursting membrane of the propelling charge chamber moves the rod against the bursting membrane of the pressure gas tank and forces the latter membrane open. Also here the power gas flows at first into the pressure gas tank, mixes with the pressure gas to form a hybrid gas and finally flows through a diffusor into the air bag. By the way, this publication teaches to increase the pressure in the power gas chamber by reducing the outlet of the power gas chamber.

DE-OS 23 39 605 describes both a hybrid system and a pure pressure gas system. In the hybrid system, at first the power gases flow into the air bag. They are followed by the pressure gas from the pressure gas reservoir. In the pure pressure gas system, two pressure gas chambers are disposed successively in flow direction and are separated from each other by a partition. The partition has a small port, however, so that the two chambers are constantly in flow communication. The partition is additionally formed as bursting disk. In the case of a crash signal, at first pressure gas escapes unhindered from the front pressure gas chamber. Hereby a pressure difference occurs at both sides of the partition. If the pressure difference reaches a predetermined value, the partition breaks and consequently bursts.

Further hybrid systems are known from DE-OS 23 23 231, DE-OS 23 00 577 and DE-OS 24 20 411. In all cases, the power gas flows through the pressure gas tank. Therefore the latter must be capable of absorbing the pressure peaks of the power gas.

Proceeding from this prior art, the invention deals with the problem to further develop the process mentioned in the beginning of the kind given in the generic title of claim 1 and the safety system mentioned in the beginning of the kind given in the generic title of claim 10, in particular in such a way that at least some of the described drawbacks can be avoided, but that at least the effects thereof can be reduced.

According to the process, this problem is solved by the entire subject-matter of claim 1, particularly by the fact that the filling gases are substantially concentrated only outside their reservoirs (characterizing portion of claim 1).

Also the safety system of claim 10 solves the aforementioned problem, in particular by the feature that the gas outlets from the pressure tanks open into a space lying outside these reservoirs (characterizing portion of claim 10).

In the invention according to the claims 1 and 10, the filling gases, for instance a power gas and a pressure gas, are combined only outside their reservoirs. Thus the pressure gas tank need not absorb the pressure peaks of the power gas.

The mutual shielding of the two filling gas tanks permits an optimum mutual adaptation of the two filling mediums or the starting materials thereof, in particular to achieve desired filling parameters. Hereby desired temperatures and desired pressure and volume ratios of the hybrid gas flowing into the air bag can be obtained. At the same time, care can be taken that the air bag is not hurled against the passenger like a narrow club at the beginning of the inflating operation, but that it is inflated uniformly and broadly right from the start. The adaptation of the fillers can be achieved by choosing suitable different chemical compositions of the fillers and/or the starting materials thereof; but also by storing gases at different pressures and/or by blowing them into the air bags staggered in time.

Preferably, for shielding the filling gases from each other and from the exterior a bursting seal common for at least two filling gas reservoirs is used which preferably closes the gas outlets of the pressure reservoirs. This is a simple possibility of safeguarding a simultaneous opening of the reservoirs and a simultaneous release of the filling gases, respectively (claims 2 and 11).

The bursting seal is preferably formed of one piece or of several pieces. In the case of a multipiece bursting seal, the parts are positively connected, however. Such a bursting seal is easy to manufacture, and in particular easy to mount (claims 3 and 12).

According to a further preferred embodiment, means which are arranged and designed in the kind of a multiple-way valve, especially a three-way valve, are employed for concentrating the filling gas flows. The elements of these means are preferably constituted by the gas outlets, the common bursting seal thereof and the space of gas concentration. Hereby an exact and controllable guiding of the gas flows is ensured (claims 5 and 13).

The subject-matters of the claims 6 and 14 exhibit all advantages of a hybrid system. The subject-matter described in claim 15 combines the advantages of a hybrid system with those of a toroidal pressure gas tank and a power gas tank disposed in the central hole of the former. In this case, the bursting seal is a disk-shaped member and covers the pressure gas outlets of the pressure gas tank and the power gas tank from outside. The disk-shaped bursting seal member is further connected to the outer edge of a power gas outlet in the form of a pipe socket through a first and circumferential predetermined breaking seam; in addition, it is connected to the external wall of the pressure gas tank or a part projecting therefrom through a second circumferential, predetermined breaking seam.

Especially preferably, the march of pressure of the power gas in the propelling charge reservoir, such as the pressure increase of the power gas after ignition and/or the successive pressure drop is controlled in particular to result in as uniform pressure ratios as possible at the space of concentrating the two filling gas flows. The uniform inflation of the air bag achieved in this way is easy on the airbag and takes care of the person held by the air bag (claims 7, 8 and 17). The means for controlling the march of pressure of the power gas may preferably comprise also means for controlling the time interval between forcing the bursting seal open and the discharge of power gas from the power gas tank (claim 17). The aforementioned measures of the process and the means provided to this effect are also successful, when the filling gases are not concentrated as late as outside their filling gas tanks but already before. Herefor the applicants explicitly reserve themselves an independent protection. However, these means and process steps are employed most preferably in a process and an apparatus according to claims 1 or 10.

It is preferred to use a throttle element, which is preferably positioned between the propelling charge and the location of the gas outlet from the propelling charge tank, as a means for controlling the pressure march of the power gas and/or for controlling the time interval between forcing the bursting seal open and the discharge of the power gas from the power gas tank. The throttle element may be either stationary or guided movably toward the bursting seal (claim 18). Possible configurations of a movable throttle element, in particular in conjunction with one or more throttle openings moving in synchronism with the throttle element, as well as the related advantages are resulting from claims 19 to 22. By the measures described there also a time delay of the discharge of power gas can be controlled. The time delay, and moreover also the amount of power gas escaping from the power gas tank per time unit, can be additionally influenced by the flow and by-pass channels listed in claim 23. For these measures, too, the applicants reserve themselves an independent protection, although they are employed in an especially preferred manner in a process according to claim 1 or in a safety system according to claim 10.

This applies analogically also for the process in accordance with claim 9 and the safety system in accordance with claims 24 or 25. The stepwise release of pressure gas further renders the inflation of the air bag more uniform. In addition, the partitions given in claim 25 increase the stability of the pressure gas tank.

Further preferred embodiments are resulting from the other claims.

In the following, the invention and the advantages thereof are illustrated in more detail by way of embodiments and the attached schematic drawing substantially restricted to the principle.

BRIEF DESCRIPTION OF THE DRAWINGS

FIG. 9 is another embodiment including a movable throttle element and a reinforced propelling charge support;

FIG. 9a is a cross-section along lines 9a of FIG. 9;

FIG. 9b is a pressure graph corresponding to FIG. 9;

FIGS. 12 to 15 show propelling charge supports including adjacent components, again in graphical representation as in FIG. 3;

FIG. 14a is a cross section along lines 14a of FIG. 14;

FIG. 15a is a cross section along lines 15a of FIG. 15.

FIG. 16 is a section across an embodiment including a multi-piece bursting seal in graphical representation as in FIG. 2, and FIG. 17 is a section across a front passenger safety system comprising a pressure gas tank subdivided into plural chambers.

Figure 1:
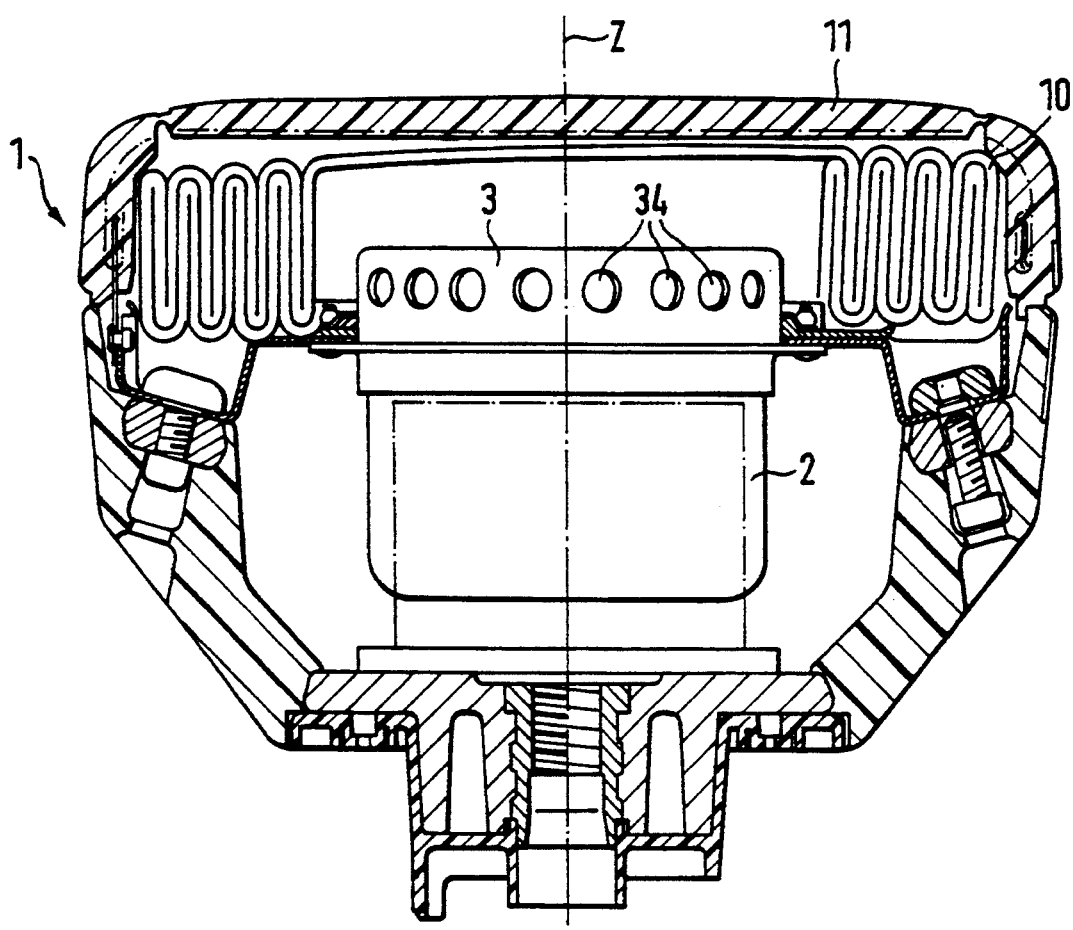
FIG. 1 is a partial section across a steering wheel system.

The terminology used in the following is to facilitate the readability of the description, but is not understood to be restricting. For example, the terms "up", "down", "right", "left", "inside" and "outside" refer to the positions relative to the geometrical center of the graphical representation of embodiments. The a.m. terminology includes the foregoing terms as well as derivations thereof and terms having similar meanings. As for the rest, parts having the same effect usually are denoted with the same reference numeral in all drawings.

The embodiment of FIG. 1 shows a survey of a safety system 1 disposed in a bowl-like interior of a vehicle steering wheel, approximately in accordance with the systems described in DE-A-21 31 902 or DE-OS 21 43 165. The filling medium for the gas cushion (also referred to as air bag or air cushion) is a hybrid gas, for instance, namely a mixture of a gas stored under pressure and a power gas, also referred to as generator gas, generated from a propelling charge. In FIG. 1 merely the outer periphery of a pressure tank 2 for the pressure gas is seen. Upon occurrence of a crash-characteristic signal, the pressure gas tank 2 and a power gas tank not shown are opened. The two gases then flow through a diffusor 3 and the outlets 34 thereof and finally inflate the air bag 10, until it breaks a cover 11 and is positioned protectively in front of the driver. The safety means 1 is disposed in rotational symmetry to a central axis Z.

Figure 2:
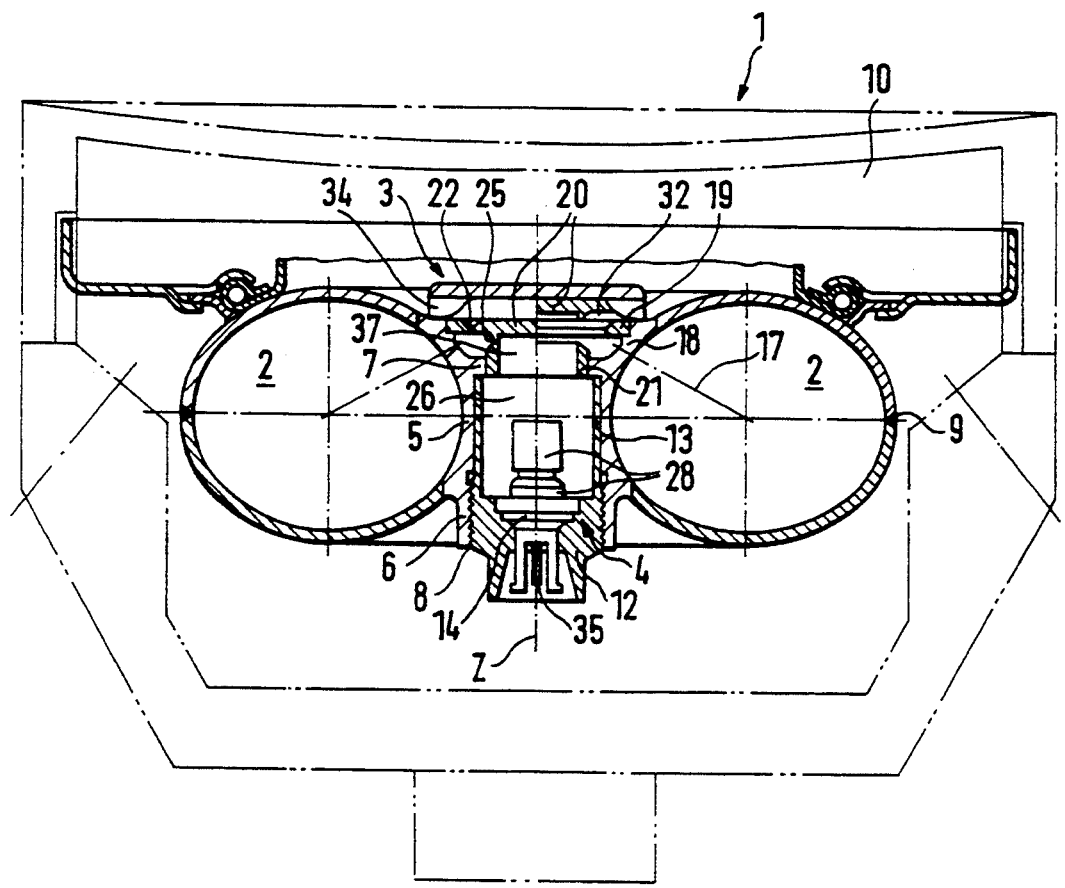
FIG. 2 is a longitudinal section across another embodiment having a toroidal pressure tank and a heating or power gas chamber disposed in the central hole.

FIG. 2 shows another embodiment of the safety system 1 in longitudinal section. The pressure gas tank 2 is generally toroidal,. i.e. it has the shape of a hollow ring body. A body of this kind excels by a high compression strength, a relatively small surface and a large volume.

In the central hole of the pressure gas tank 2 a release means 4 is disposed substantially in the center. The central hole is the area around the central axis Z surrounded by the hollow ring body. The release means 4 is formed as a tank insert and serves as chamber 26 for generating and storing the power gas for a short time. The release means 4 is directly adjacent to the wall 5 of the central hole. The central hole wall 5 is part of the outer wall of the pressure tank 2. The central hole wall 5 is downwardly transformed into a tubular projection 6 and has a shoulder 7 at the top. The tank insert 4 includes a tank bottom 12 which is transformed into a sleeve-like projection 13, also referred to as tank insert wall 13. The release means 4 is screwed into the central hole from the bottom so that the tank bottom 12 and the projection 6 of the central hole are connected to each other via a thread 8. In the screwed-in position, the free (upper) edge of the tank insert wall 13 abuts the shoulder 7 of the central hole.

The tank insert wall 13 encloses the chamber 26, also called propelling charge chamber in the following. In the propelling charge chamber 26 a propelling charge 28 is provided which generates power gas, i.e. the one component of the hybrid gas, upon receipt of a crash-characteristic signal. The propelling charge 28 is positioned in a propelling charge support 14 projecting through the tank bottom 12. Ignition pins 35 project through the propelling charge support 14. They serve for connecting an ignition circuit (not shown).

The power gas chamber 26 opens into a power gas outlet or channel 37. The power gas channel 37 is directed to a space 32 in the diffusor 3 and is surrounded by a sleeve, referred to as power gas outlet sleeve 21. The foot area of the power gas outlet sleeve 21 is connected, preferably laser-welded, to the shoulder 7 of the central hole. The free end of the power gas outlet sleeve 21 is connected to, and thus closed by, a bursting seal 20 through a predetermined breaking seam. The bursting seal 20 is substantially disk-shaped and is connected to a member 19 through a further predetermined breaking seam 22. The member 19 in turn is connected, preferably laser-welded, to the outer wall of the pressure gas tank 2 facing the central hole. In the represented embodiment, the member 19, the disk-shaped bursting seal 20 and the power gas outlet sleeve 21 are a one-piece component, which entails constructional advantages. The bursting seal 20 is illustrated in the closed state in the left half of the picture and in the forced-open state in the right half thereof. This illustration is continued, where appropriate, in the further Figures, too.

If the power gas in the power gas chamber 26 exceeds a predetermined pressure, namely the bursting pressure, it forces the bursting seal 20 open.

The pressure gas chamber 2 has plural gas outlets 18 in its annular wall portion facing the bursting seal 20. The central axes 17 of the pressure gas outlets 18 end radially in the space 32. The bursting seal member 20, the member 19 integrally connected therewith and the power gas outlet sleeve 21 likewise connected integrally therewith constitute a joint seal for the pressure gas outlets 18 and the power gas outlet 37. This seal is approximately disk-shaped (bursting disk 20) with a sleeve-like projection (power gas outlet sleeve 21) being put thereon. There is a circumferential recess (predetermined breaking seam 25) between the foot of the projection and the disk. The disk has a larger diameter than its projection and is transformed into an annular member (member 19) in its periphery via another circumferential recess (predetermined breaking seam 22).

When the bursting disk 20 is forced open, the pressure gas and the power gas concentrate in the space 32.

The illustrated shape and arrangement of the bursting seal 20 ensures that the gas outlet channels 18 and 37 are always forced open simultaneously. Moreover the gas outlet channels 18 and 37 as well as the gas concentration space 32 disposed outside the bursting disk 20 are arranged in the kind of a multi-way, in particular three-way valve. Hereby it is safeguarded that, when the power gas channel 37 is forced open, the power gas does not penetrate and pressure-load the pressure gas tank 2. On the contrary, the gas escaping from the power gas outlet 37 at high speed also entrains the pressure gas due to its suction effect (Bernoulli principle/water jet blast), i.e. it sucks the pressure gas out of the pressure gas tank 2. Finally, the complete shielding of the two pressure chambers 2 and 26 as well as the concentration of the gases stored therein for the first time in the outer space 32 has the following advantage: The gases and pressure ratios, resp., do not influence each other, but they can be stored under optimum conditions in each case.

As for the rest, the means for receiving the air bag 10 on the pressure tank 2 is mounted so that the diffusor outlets 34 open into the air bag 10. For constructional reasons, the pressure tank 2 has a weld 9 extending along the cutting line between its radially outer wall and its horizontal center plane. The embodiment represented in FIGS. 1 and 2 is extremely compact and is therefore adapted to be conveniently housed in the steering wheel of a motor vehicle.

Figure 3:
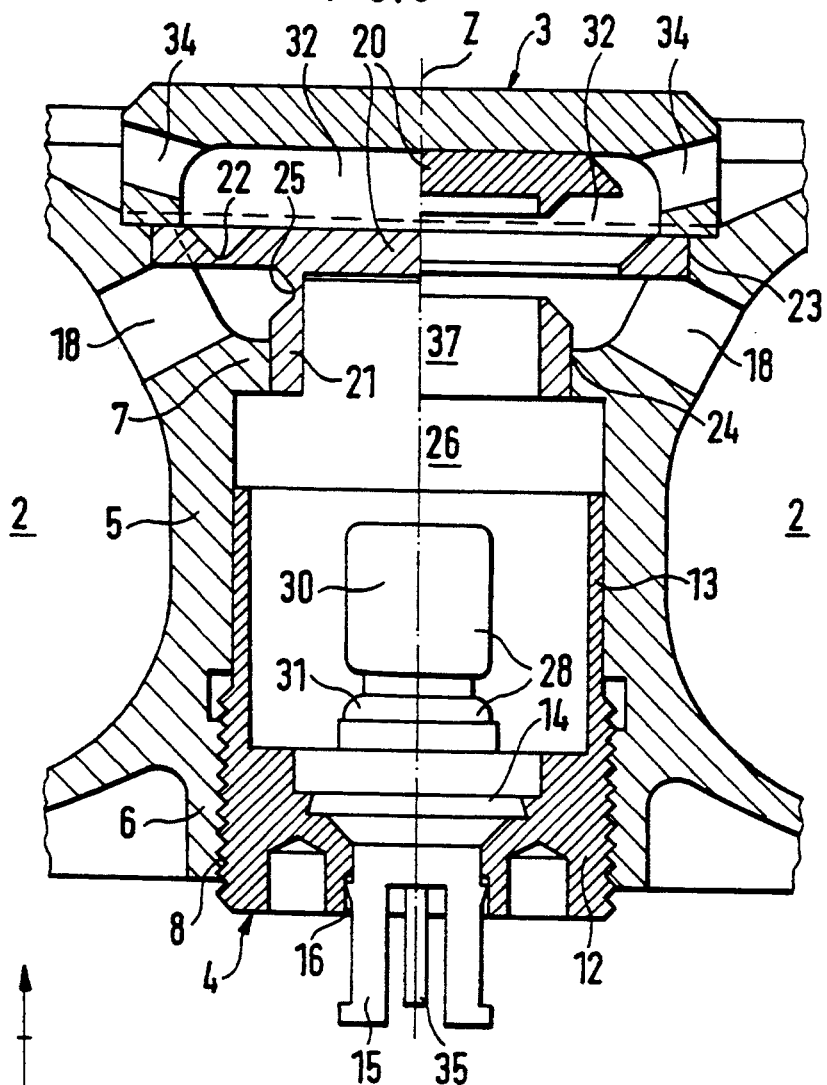
FIG. 3 is a section of the area surrounding the central axis of a further embodiment.

FIG. 3 shows a longitudinal section (vertical section along the central axis Z) across the propelling charge chamber 26 of another embodiment in magnification.

This embodiment substantially differs from the embodiment of FIG. 2 only by the release means 4, i.e. the tank insert. To avoid repetitions, it is therefore referred to the description of FIG. 2.

In this embodiment, the sleeve-like tank insert wall 13 of the release means 4 does not reach to the shoulder 7 of the central hole. Otherwise the propelling charge support 14 definitely projects from the tank bottom 12. The projecting end of the propelling charge support 14 includes little feet 15 which shield and protect the ignition pins 35 and moreover contact the inner wall of a recess 16 in the tank bottom 12 with a nose. The propelling charge support 14 can be pushed through the tank bottom 12 from the top, i.e. the little feet 15 first. In the final position of the propelling charge support 14 the feet 15 engage with their noses in the bottom recess 16.

The propelling charge support 14 receives the propelling charge 28. The latter includes a heating charge 30 and a priming cap 31. The propelling charge 28 may as well be a uniform charge, for instance in the kind of the Nato maneuver cartridge 7.92 mm. But also other propelling charges whose compositions are adapted to the pressure medium stored in the pressure tank 2 to obtain a desired hybrid gas, in particular to obtain desired filling parameters of the air bag 10, may be employed. When the pressure gas expanding from the pressure gas tank 2 and the power gas escaping from the power gas chamber 26 are mixed to form a hybrid gas, not only the temperature, the volume and the pressure of the expanding pressure gas are increased, but also the flow speed thereof. By an appropriate mutual adaptation of the pressure gas and the power gas including an adaptation of the mutual flow conditions, the filling parameters of the air bag 10, for instance the course of filling, including the course of the varying shapes of the air bag 10 can be controlled during inflation. The same applies to the filling speed, the filling temperature, the filling pressure and/or the filling volume including the time variations of these parameters during inflation.

Figure 3A:
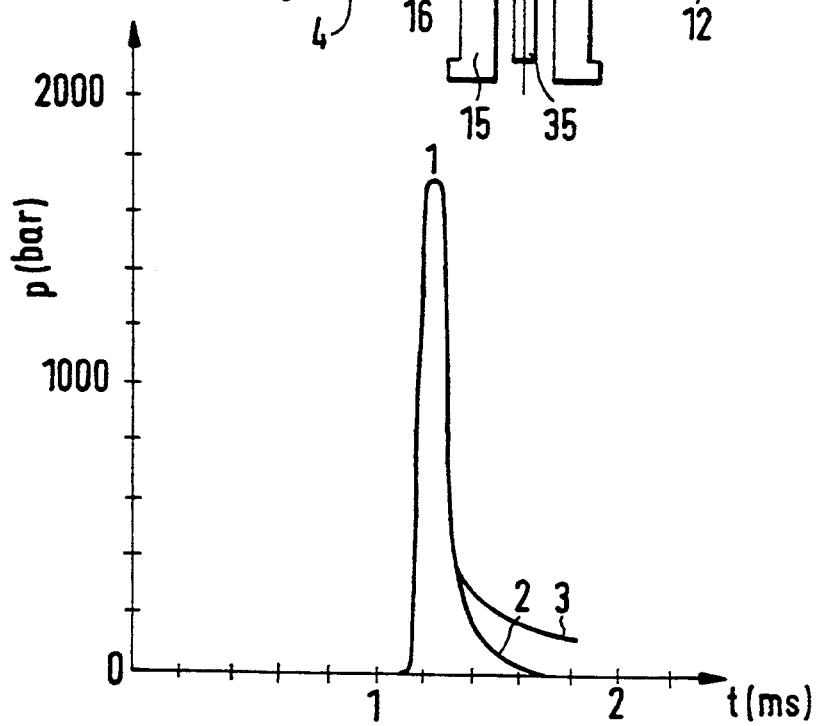
FIG. 3a is a pressure graph corresponding to FIG. 3.

FIG. 3a illustrates the approximate march of pressure (time variation of pressure) in the safety system 1. The curve 1 shows the march of pressure in the propelling charge chamber 26 and the curves 2 and 3 show the march of pressure in the gas concentration space 32. Curve 2 shows the ratios with an empty pressure gas tank 2 and curve 3 shows the ratios with a pressure of 250 bar in the pressure gas tank.

When forcing the bursting disk 20 open, the pressure in the heating charge chamber 26 is abruptly reduced to the pressure level of the pressure gas tank 2. Generally speaking, in a pressure range corresponding to the pressure gas tank, namely about 250 bar and less, the combustion of the heating charge 30, i.e. the conversion of the chemical substances contained therein, is interrupted. Irrespective of the amount of heating charge, a cutoff occurs. Unburnt solid particles flow into the air bag 10 through the diffusor outlets 34. The amount of unburnt heating charge 30 depends on the bursting pressure. Tolerances of the bursting pressure cause dispersions and thus may lead to a different inflating behaviour of the air bag 10.

Figure 4:
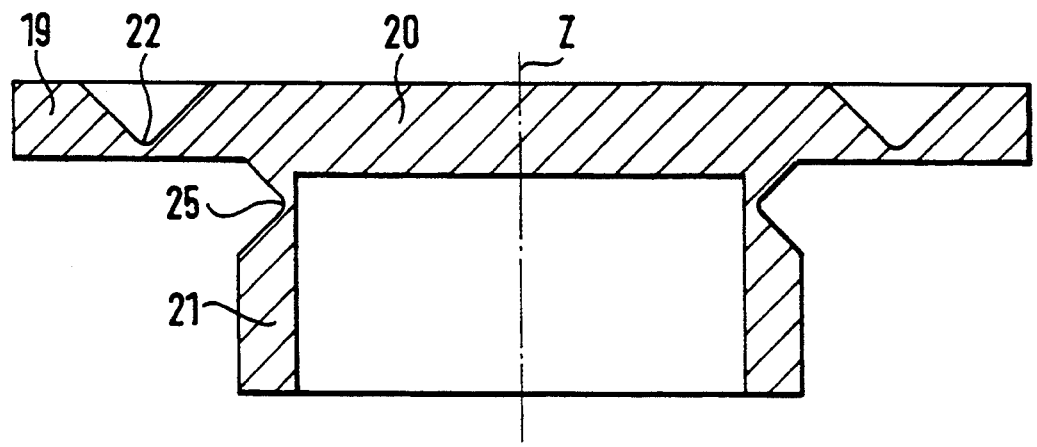
FIG. 4 is a section across an embodiment of a bursting seal integrally formed with further parts of the safety system.

Before discussing the solution of the aforementioned problem, reference is made to FIG. 4. There the one-piece connection of the disk-like burst seal 20 with the annular member 19 and the power gas outlet sleeve 21 is once again represented in magnification; and so are the V-shaped recesses forming the annular predetermined breaking seams 22 and 25. As already stated, the arrangement of the members 19, 20 and 21 always ensures that the gas outlet channels 18 and 37 are forced open simultaneously, independently of whether the three a.m. members are manufactured of one single piece or are interconnected otherwise via the predetermined breaking seams 22 and 25.

Figure 5:
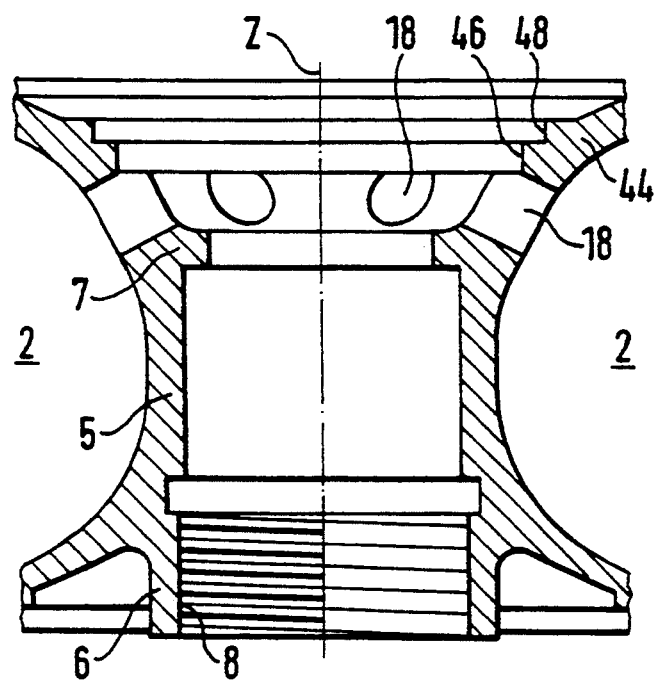
FIG. 5 is an embodiment of a bedding of the bursting seal shown in FIG. 4.

FIG. 5 shows the bedding for the seal means illustrated in FIG. 4. Above the annular pressure gas outlets 18, the wall of the pressure gas tank 2 has a reinforcement 44. In this reinforcement two stepped annular recesses 46 and 48 are provided. The member 19 is supported in the lower annular recess 46 and is laser-welded there. At its foot the propelling gas outlet sleeve 21 is laser-welded to the free ends of the shoulder 7 of the central hole. The two welds have the reference numerals 23 and 24 (see e.g. FIG. 3). The diffusor 3 is positioned in the upper annular recess 48.

Figure 6:
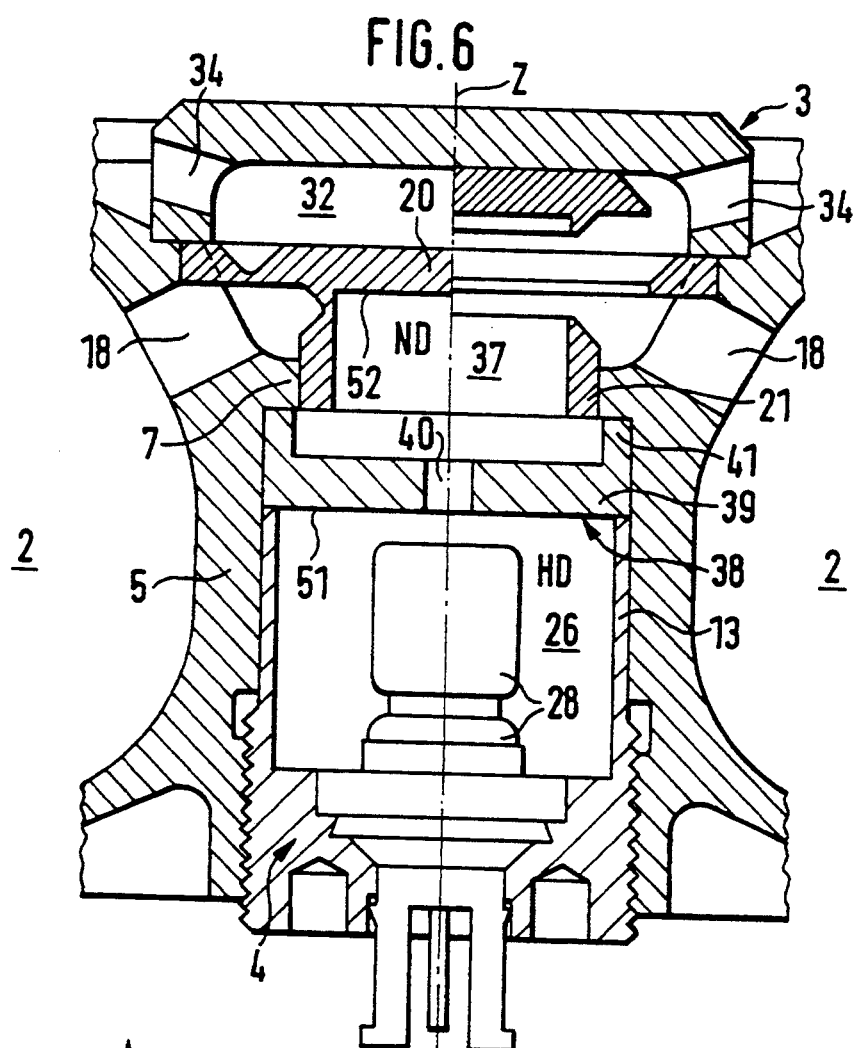
FIG. 6 is an embodiment including a stationary throttle element, in the way of illustration chosen in FIG. 3.

In FIG. 6 an embodiment is seen which solves the problem of a rapid pressure loss explained in FIG. 3. This embodiment differs from that of FIG. 3 by a means for controlling the march of pressure of the power gas in the power gas tank 26. This means is a throttle element 38 stationarily arranged between the propelling charge 28 and the power gas outlet 37. The throttle element 38 is a disk 39 having an annular projection 41. The surface of the disk facing the propelling charge 28 is supported with its edge on the free ends of the sleeve-like tank insert wall 13. The free ends of the annular projection 41 abut the free surfaces of the shoulder of the central hole (facing the disk 39). The shell surface of the annular projection 41 contacts the upper portion of the wall 5 of the central hole. Accordingly, the throttle element 38 bridges over the internal cross-section of the propelling charge tank 26. A throttle opening 40 crosses the center of the disk 39. However, the throttle opening 40 may as well be offset with respect to the center.

Hereby the power gas tank 26 including the power gas outlet 37 is divided into a high-pressure zone HD and a low-pressure zone ND. The high-pressure zone HD is communicated with the low-pressure zone ND via an open nozzle having a predetermined diameter, namely the throttle opening 40. The throttle opening 40 is selected such that the high-pressure zone HD building up after ignition of the propelling charge 28 is maintained for such a long time that the combustion of the amount of heating charge is guaranteed in a reproducible way. At the same time, the low-pressure zone ND builds up in the space provided above the disk 39. The throttle opening 40 ensures, after forcing the bursting seal 20 open, an apportioned continuous flow of hot power gases and thus a controlled heating of the pressure gas escaping from the pressure gas tank 2. Hereby the inflating behaviour of the air bag 10 can be controlled in a reproducible manner.

Figure 6A:
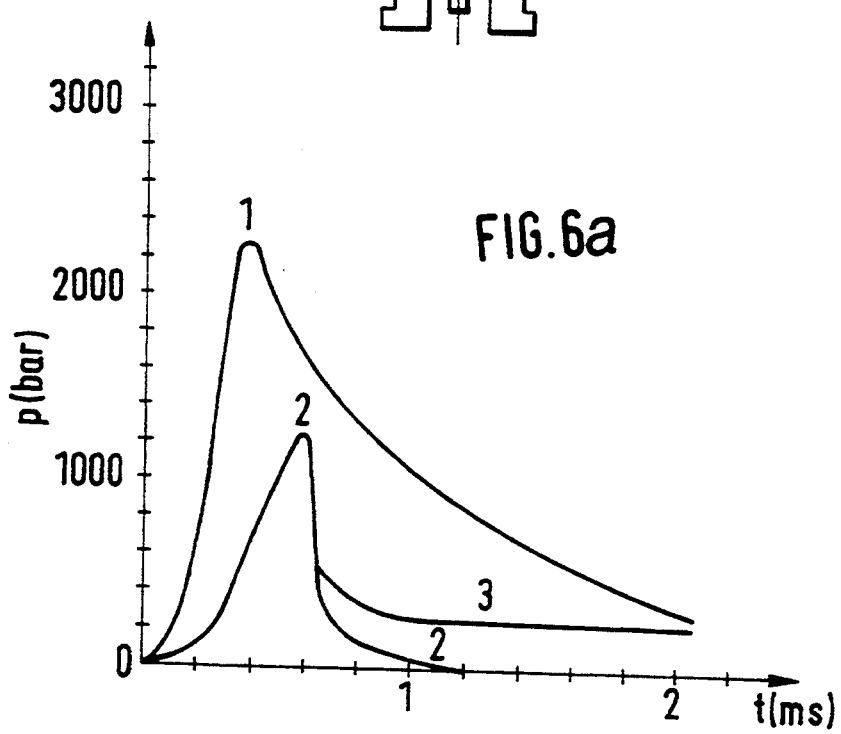
FIG. 6a is a pressure graph corresponding to FIG. 6.

The pressure behaviour in the high-pressure zone HD and in the low-pressure zone ND is shown in FIG. 6a by the graph of pressure and time.

The pressure sustained for a relatively long time in the high-pressure zone HD ensures an optimum conversion and a complete burn-off of the heating and propelling charge. No hot or even burning powder particles do reach the air bag 10 any more. Even in the case of a stronger heating or propelling charge, the pressure in the low-pressure zone ND is restricted to the value shown in the curves 2 and 3. These curves illustrate that the air bag 10 is inflated in a careful and uniform manner practically independently of the march of pressure in the high-pressure zone HD.

The aforementioned controlled flow of the hot power gases into the diffusor 3, more exactly into the space of gas concentration 32 entails a controlled heating of the pressure gas and thus prevents a pressure drop of the expanding pressure gas. Such a pressure drop would be serious especially at low temperatures, where the gases cooling down due to the expansion would expand even more. Consequently, the throttle element 38 renders the safety system practically independent of external temperature influences.

The cross-sectional area 51 of the disk 39 lying in the region of the high-pressure zone HD is larger than the cross-sectional area 52 of the bursting seal 20 lying in the region of the low-pressure zone ND. These cross-sectional areas are designed so that the bursting cross-sections break, before a considerable pressure increase occurs on the low-pressure side ND. The pressure level in the high-pressure zone HD can be defined by the following control parameters according to the burn-off conditions, without other parameters being influenced:
  combustion behaviour of the type of propellant;
  charge density of the propelling charge 28;
  cross-section of the throttle opening 40.

Figure 7:
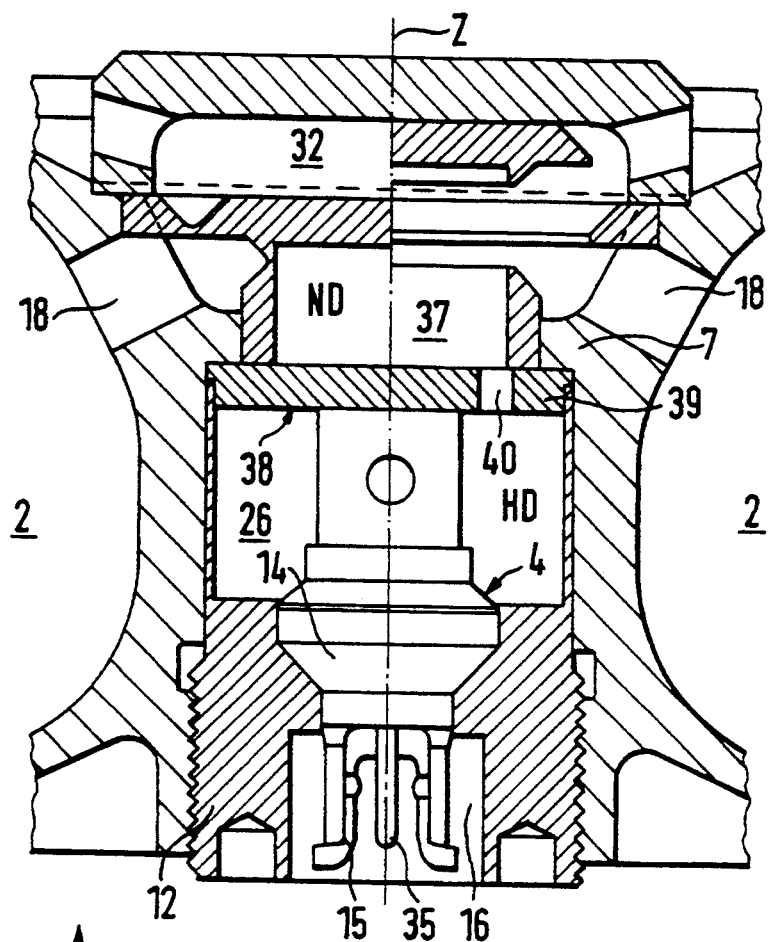
FIG. 7 is a variant of the embodiment illustrated in FIG. 6.

The embodiment of FIG. 7 substantially differs from the embodiment of FIG. 6 by a reduced high-pressure zone HD. In addition, in this embodiment the eccentrical arrangement of the throttle opening 40 mentioned in FIG. 6 is illustrated. Finally also the low-pressure zone 37 is smaller than in the embodiment of FIG. 6.

As for the rest, the throttle element 38 shown here includes no annular projection 41. Instead, the disk 39 is directly adjacent to the shoulder 7 of the central hole and is supported on the free ends of the sleeve-like tank insert wall 13 via a shoulder in its edge area. As compared to the embodiment of FIG. 6, the bottom 12 of the propelling charge tank is lifted in the direction of the propelling charge chamber 26. The same is true for the bottom recess 16. The little feet 15 and the ignition pins 35 remain completely in the bottom recess 16. Therefore they are protected even better against external influences. Finally, the shape of the propelling charge support 14 is different from that of the aforedescribed embodiments.

Figure 7A:
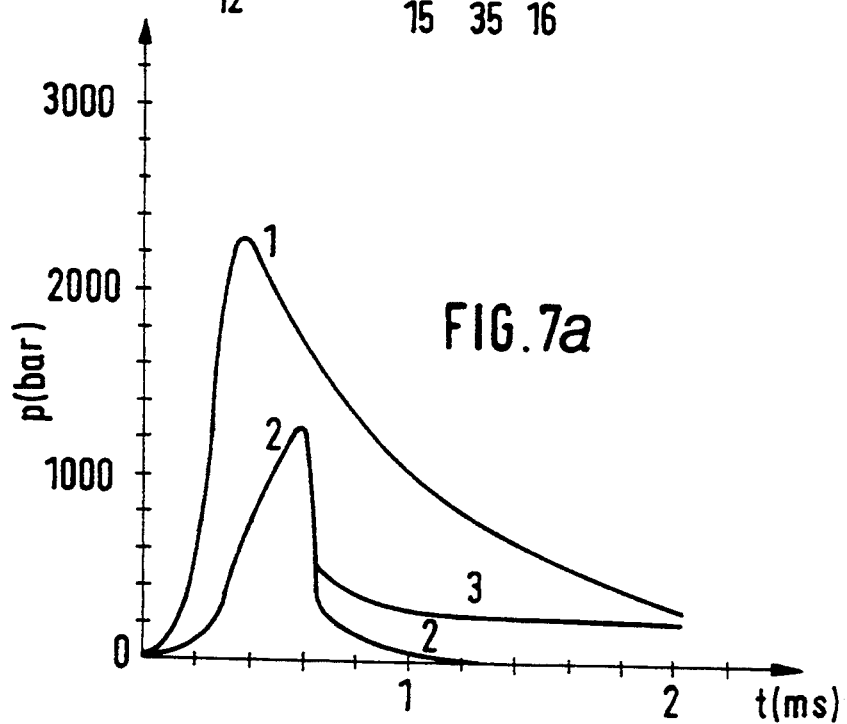
FIG. 7a is a pressure graph corresponding to FIG. 7.

The pressure behaviour of this embodiment shown in FIG. 7a substantially corresponds to the pressure behaviour shown in FIG. 6.

Figure 8:
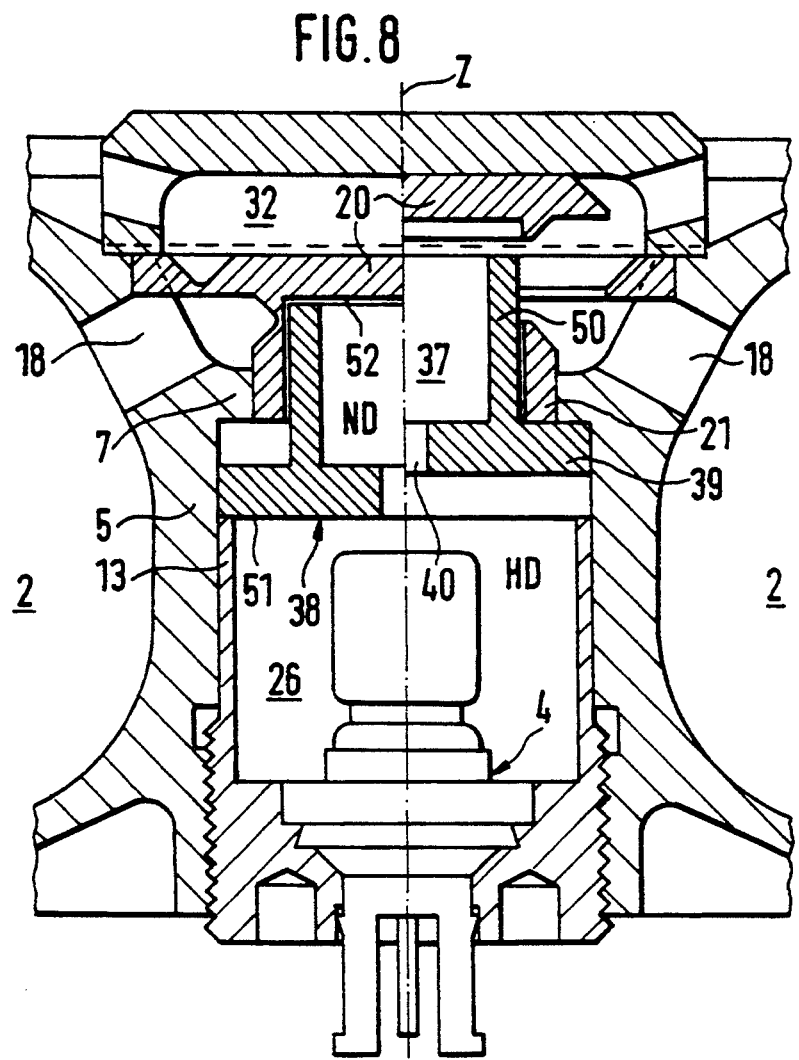
FIG. 8 is an embodiment including a movable throttle element, again in graphical representation as in FIG. 3.
Figure 8A:
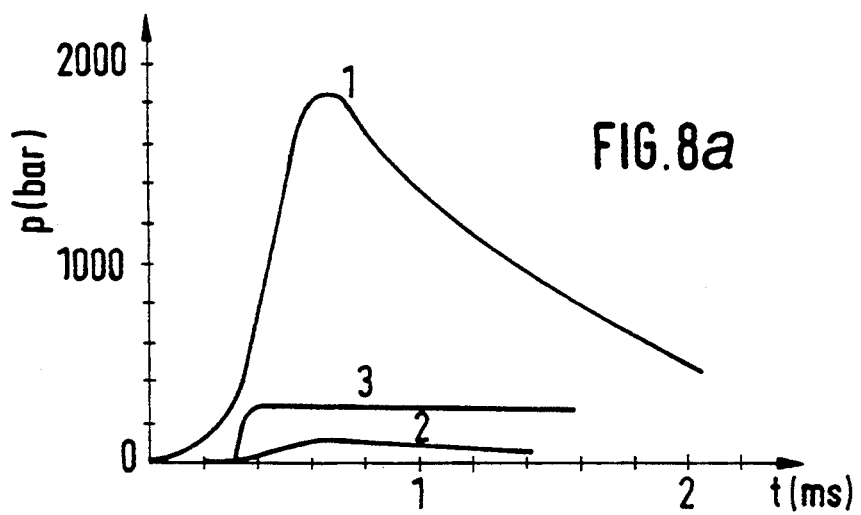
FIG. 8a is a pressure graph corresponding to FIG. 8.

The embodiment of FIG. 8 differs from the embodiment of FIG. 6 substantially by the fact that the throttle element 38 is movably guided toward the bursting seal 20 in the propelling charge chamber 26 and serves as a tappet to break the bursting seal 20 open.

When moving the throttle element 38 toward the bursting seal 20, also the low pressure zone ND moves in the direction of the gas concentration space 32.

In detail, the throttle element 38 comprises the disk 39 already described before. The latter is supported with its lower edge on the free sleeve edge of the tank insert wall 13. The circumferential surface of the disk 39 is guided upward along the wall 5 of the central hole, until it is adjacent to the shoulder 7 of the central hole. The distance covered is referred to as lift of stroke in the following. The throttle opening 40 is centrically guided through the disk 39, however it may also be disposed basically eccentrically in this embodiment. From the disk 39 a sleeve-like attachment 50 protrudes in the direction of the bursting seal 20. The free sleeve edge of the attachment 50 ends directly before the bursting seal 20 or adjoins the same. The shell surface of the attachment 50 is guided in the power gas outlet sleeve 21 while being moved toward the bursting seal 20.

By carrying the low-pressure zone ND in the direction of the bursting seal 20, as already mentioned, also the opening end of the power gas outlet channel 37 is displaced upward, i.e. into the space of gas concentration 32, namely beyond the free ends of the power gas outlet sleeve 21. When activating the release means 4, the throttle disk 39 supports the high pressure building up in the propelling charge chamber 26 at the bursting seal 20 via the sleeve-like attachment 50. Here the pressure in the heating charge chamber 26 does not reach the pressure peaks shown in FIG. 6a, but it is definitely below that (see pressure graphs). Also in this pressure range still a complete chemical conversion, namely a burn-off of the amount of heating material or propelling charge is guaranteed. The reduction of the pressure peaks is a consequence of the movement of the throttle element 38 toward the bursting disk 20 and a related enlargement of the volume of the propelling charge chamber. In addition, the energy stored in the power gas and thus the pressure is reduced by the lifting work of the throttle element 38. In this respect, also the cross-sectional ratio between the surface 51 of the throttle disk 39, upon which the high-pressure zone HD acts, and the surface 52 of the bursting seal 20, upon which the low-pressure zone ND acts, has to be considered, of course. It has to be assumed that the bursting seal 20 will break earlier than in the embodiment of FIG. 6, even if identical cross-sectional ratios between the surfaces 51 and 52 are provided in the two embodiments. As the bursting seal 20 breaks earlier, the pressure in the low-pressure zone ND and thus also the pressure in the gas concentration space 32 is below that of the embodiment of FIG. 6, which is confirmed by the pressure graphs. As for the rest, in the embodiment of FIG. 8 slower power gases and thicker bursting cross-sections can be used. Hereby more flexibility is attained when using certain materials. Influences by power gases burning off either more quickly or more slowly are negligible.

The embodiment of FIG. 9 substantially differs from the embodiment of FIG. 8 by the following features: the throttle element 38 and the propelling charge support 14 are designed differently. The propelling charge support 14 is described later. However, it is mentioned here already that also one of the propelling charge supports 14 of the preceding Figures may be employed instead of the shown propelling charge support 14.

The throttle element 38 is again movably guided toward the bursting seal 20, however this time it is designed like an internally hollow piston. On the whole, it seals the high-pressure zone HD and the propelling charge chamber 26 against the bursting seal 20. In this way, even more favourable ratios of pressure and inflation can be achieved—in addition to the advantages already explained by way of FIG. 8.

In detail, the throttle element 38 in the form of a hollow piston includes an end face 54 adjoining the bursting disk 20 or being only slightly spaced therefrom, an adjacent shell surface 56 extending into the power gas chamber 26 and finally a nose 58 in the form of an annular flange. The nose 58 is guided radially outwardly up to the tank insert wall 13, is supported by a shoulder 60 on the free sleeve edge of the tank insert wall 13 and, at the same time, adjoins the wall 5 of the central hole. The throttle element 38 substantially has the shape of a U turned upside down including a flange-like annular edge. During its lifting movement, it is guided by the tank insert wall 13 and by the wall 5 of the central hole, namely at the outer edge of the nose 58 and the shoulder 60. In addition, the shell surface 56 is guided inside the power gas outlet sleeve 21. The throttle opening is disposed in the end face 54 in this embodiment. It is directly approached to the gas concentration space 32 during the lifting movement.

Due to the hollow piston design of the throttle element 38, the volume of the high-pressure zone HD is enlarged by the volume of the low-pressure zone ND shown in FIG. 8. Already herefrom a further pressure drop by about 20% is resulting. The pressure building up after activating the release means 4 and burning off the heating and propelling charge 28 urges the end face 54 of the throttle element 38 against the bursting seal 20. The latter is forced open after the bursting pressure is exceeded. The two gas outlet channels 18 and 37 are simultaneously forced open. The stored gases escape and concentrate in the gas concentration space 32 to form a hybrid gas. Again the throttle opening 40 controls the pressure, the temperature and the volume of the hybrid gas. The pressure graph illustrates the favourable ratios of pressure and inflation.

Figure 10:
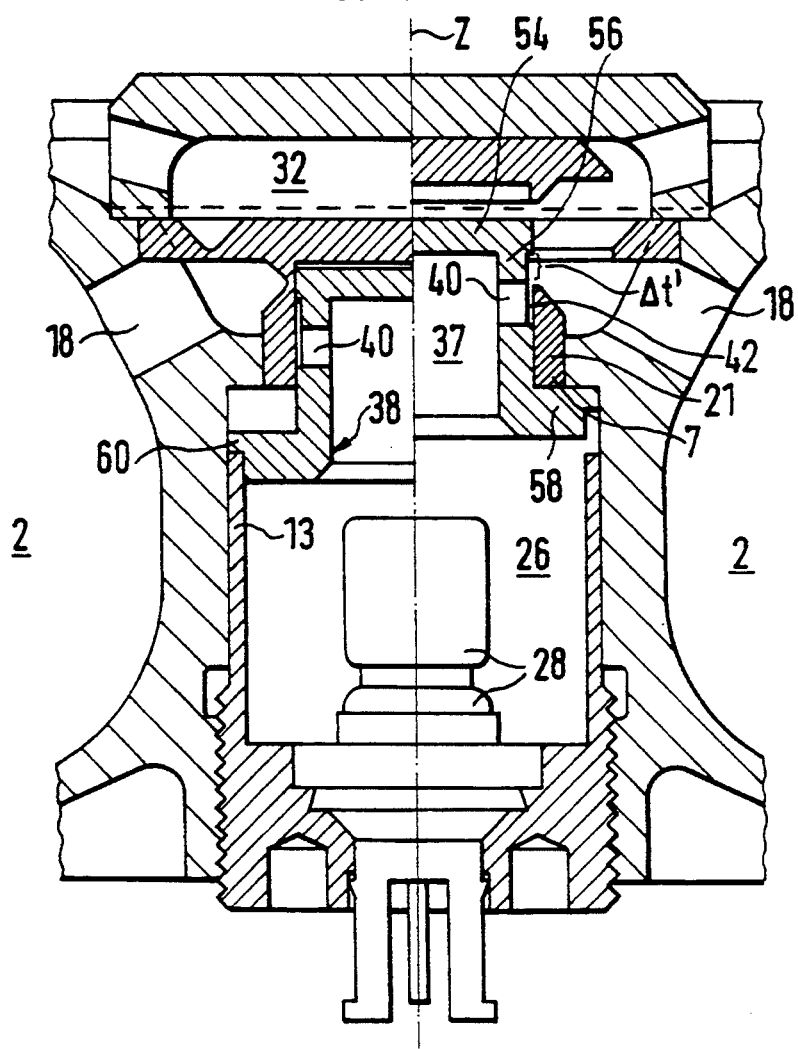
FIG. 10 is a variant of the embodiment of FIG. 9, the movable throttle element being modified for a time delay of the power gas discharge.
Figure 10A:
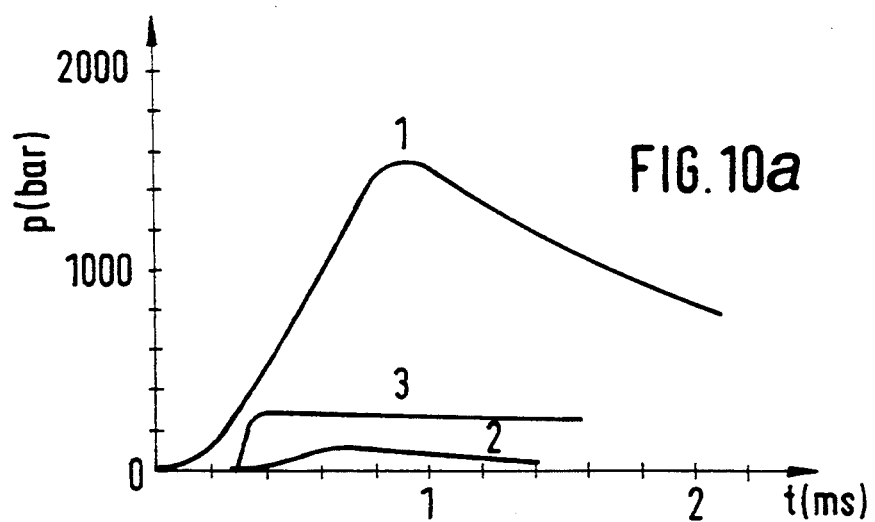
FIG. 10a is a pressure graph corresponding to FIG. 10.

The embodiment of FIG. 10 differs from the embodiment of FIG. 8 merely by a different design of the throttle element 38; from the embodiment of FIG. 9 it is furthermore distinguished by a different design of the propelling charge support 14. As far as the embodiment of FIG. 10 is in conformity with the embodiments of FIGS. 8 and 9, reference is made to the description of these Figures.

The throttle element 38 represented in the embodiment of FIG. 10 differs from the throttle element of FIG. 9 in that the throttle opening 40 is not arranged in the end face 54 but in the shell surface 56. Instead of one throttle opening 40, also plural throttle openings 40 may be provided, for instance in an annular array.

The throttle opening(s) 40 is/are arranged in the shell surface 56 such that they are covered by the power gas outlet sleeve 21 both in the stationary phase and during the lifting movement of the throttle element 38. If only one throttle opening 40 is provided, it is disposed above the power gas outlet sleeve 21 after completion of the lifting movement of the throttle element 38. Hereby the release of power gas is delayed. The lift of stroke of the throttle element 38 corresponds to a time delay $\Delta t'$.

The shell surface 56 may also have a recess 42 in the form of a channel in the area of the throttle opening 40, i.e. it may be slightly spaced apart from the inner wall of the power gas outlet sleeve 21 in this area. In this case, the power gas is released, as soon as the end of the channel recess 42 facing the front face is moved beyond the free end of the power gas outlet sleeve 21. The desired time delay $\Delta t'$ can be determined, i.e. controlled by the length of the channel recess 42. The release of power gas already starts in this case before the throttle opening 40 has reached the free end of the power gas outlet sleeve 21.

In the shown embodiment the throttle opening 40 is covered by the power gas outlet sleeve 21 also after completion of the lifting movement. Nevertheless, power gas can escape through the cannel recess 42, although at a reduced rate. This rate can be controlled, among other things, by the number of throttle openings 40 and channels 42. On the whole, the amount of power gas escaping per time unit is determined by the number and the free flow cross-section of the channel recess(es) 42 and of the throttle opening(s) 40. The time delay $\Delta t'$ for the release of power gas depends on the length of the channel recess(es) 42.

The time delay $\Delta t'$ and the amount of power gas escaping per time unit can be exactly adjusted to the flow speed of the pressure gas, which results in a very uniform inflation of the air bag 10 with low pressure peaks and a substantially constant pressure. The inflating behaviour of the air bag 10 can be controlled in a safely reproducible manner under all circumstances.

Figure 11:
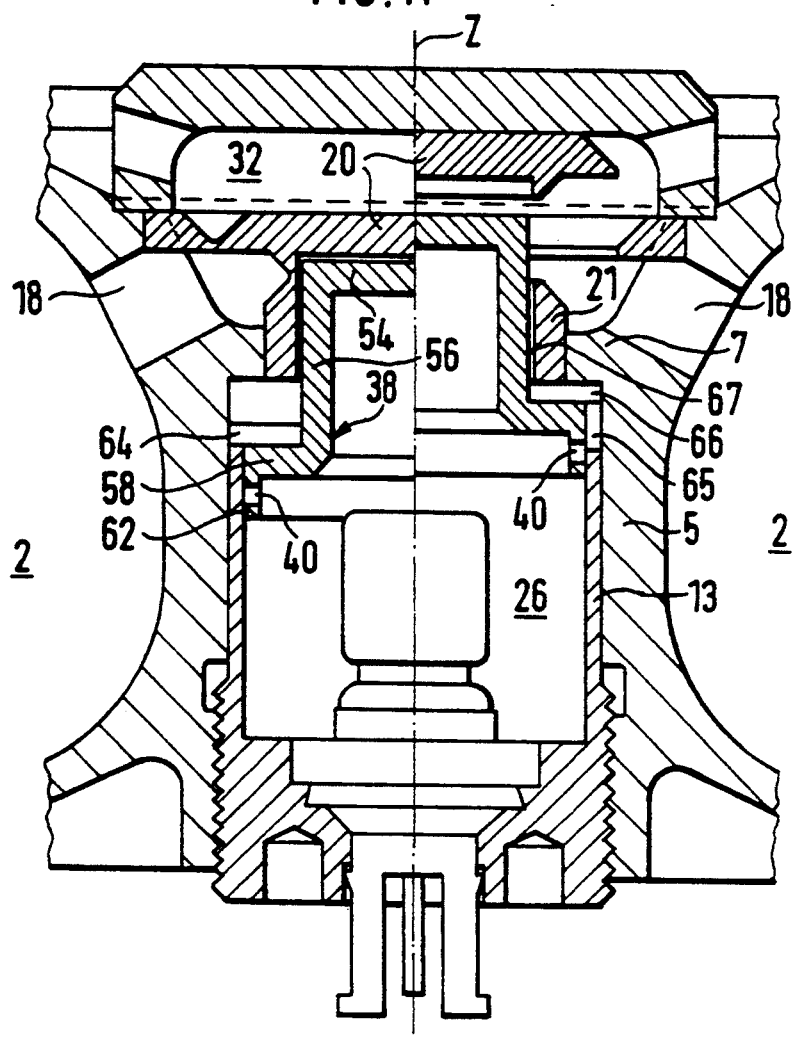
FIG. 11 is a variant of the embodiment shown in FIG. 10.
Figure 11A:
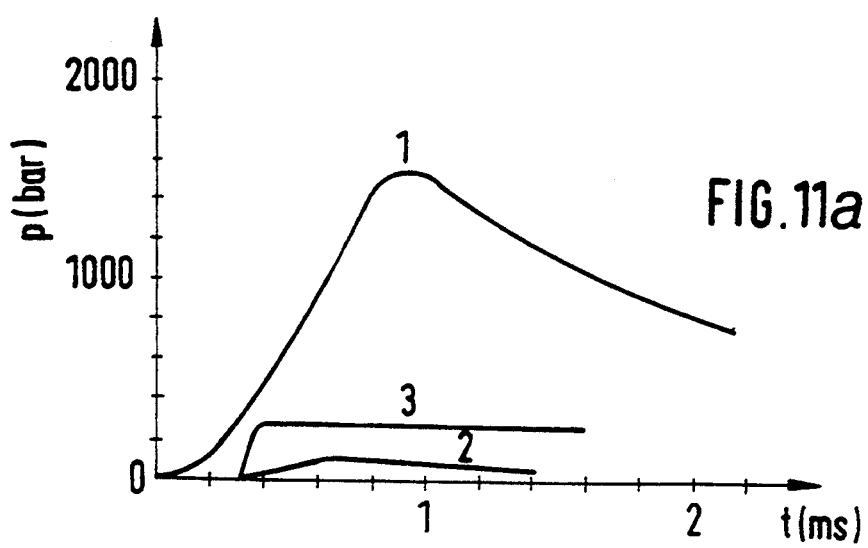
FIG. 11a is a pressure graph corresponding to FIG. 11.

The embodiment of FIG. 11 differs from the embodiment of FIG. 10 merely by a displacement of the throttle openings 40 from the shell surface 56 into an annular frame 62 protruding from the annular flange nose 58 in the direction of the propelling charge chamber 26; furthermore by a different configuration of the throttle element 38 in the area of the nose 58 and by guiding the power gas along a by-pass channel 65, 66, 67. In other words, the throttle element 38 again has the shape of a hollow piston. Also in this case, the end face 54 thereof contacts the bursting seal 20. Its shell surface 56 is again guided by the power gas outlet sleeve 21, however it has no throttle opening. In addition, the throttle element 38 is guided in the sleeve-like tank insert wall 13 by the flange nose 58, for the nose 58 including the annular frame 62 thereof adjoins the tank insert wall 13. Finally the throttle element 38 is moreover guided by the wall 5 of the central hole. To this effect, fins 64 are arranged on the side of the flange nose 58 facing the shoulder 7 of the central hole and adjoin the wall 5 of the central hole with their radially outer ends. The fins 64 protrude like shoulders over the nose 58 and are supported on the free edge of the tank insert wall 13. After a completed lifting movement, the upper free edge of the fin 64 contacts the shoulder 7 of the central hole.

This configuration of the nose 58 in the form of an annular flange results in the a.m. by-pass channel 65 and 66 provided between the nose 58 and the wall 5 or the shoulder 7, resp., of the central hole. The by-pass channel 65, 66 is continued by the further by-pass channel 67 between the shell surface 56 and the inner wall of the power gas outlet sleeve 21.

The time delay $\Delta t'$ of the release of power gas from the power gas tank 26 can be controlled by the clearance between the throttle opening(s) 40 and the free edge of the sleeve-like tank insert wall 13. This time delay $\Delta t'$ results in the fact that the power gas arrives at the gas concentration space 32 at a later time than the pressure gas. The time delay $\Delta t'$ can additionally be controlled by the length of the by-pass channel 65, 66, 67. The free flow cross-section of the by-pass channel determines the rate of escaping power gas and, of course, the march of pressure in the power gas chamber 26, too. There is another possibility of control in that—in the case of plural throttle openings 40—not all throttle openings are released by the power gas outlet sleeve 21 at the same time but staggered in time, i.e. one after the other. This is also true for the embodiment of FIG. 10, of course.

Principally, the movable throttle elements 38 can also do without a tappet function, i.e. they need not force the bursting membrane 20 open. The movement of the throttle element 38 then serves substantially for enlarging the high-pressure zone HD and for additionally reducing pressure by the lifting work done. In this case, the low-pressure zone ND is reduced in synchronism with the enlargement of the high-pressure zone HD.

The embodiments described in FIGS. 7 to 11 have the following common advantages: The low-pressure chamber is formed as tappet. Consequently, the heating charge pressure acts directly on the bursting seal 20. The heating charge pressure serves for moving the tappet and thus for opening the bursting seal 20. The temperature of the heating or power gas linked with the pressure heats the expanding gases from the pressure gas chamber 2. When enlarging the surface 51 of the tappet upon which the pressure acts as compared to the surface 52 of the bursting seal 20, the bursting seal 20 can be opened more easily or else at a lower pressure. Finally, the pressure peaks in the high-pressure zone HD are further reduced by the fact that the bursting seal 20 breaks earlier (due to the larger tappet surface) and the volume of the high-pressure zone HD is enlarged simultaneously with the movement of the tappet. If by-pass channels, namely the channels 42 and 65 to 57 are provided, the effect of the heating gas is delayed. The effect of the power gas thus can be controlled in such a way that the pressure curve of the hybrid gas remains at a constant value. By sealing the power gas chamber from the mixing space or gas concentration space 32 and by delaying the release of the power gas from the power gas chamber 26, the time of gas escape and the amount of power gas escaping per time unit can be exactly controlled. Hereby the inflation of the air bag is safely reproducible under all circumstances.

The FIGS. 9 and 12 to 15 show pressure-proof designs of ignition pin guidings and reinforcing devices at the propelling charge support 14.

At high ambient temperatures, for instance 85° C., and a relatively high and continuous pressure in the high-pressure zone HD, the propelling charge support 14 and the guiding of the ignition pins 35 through the propelling charge support 14 is exposed to extremely high loads. Therefore it is advantageous to provide reinforcing members to prevent the propelling charge support 14 or the ignition pins 35 from being pressed out and from resulting in pressure losses during inflation of the air bag 10.

In accordance with FIG. 9, the propelling charge support 14 has a substantially funnel-shaped external contour and is positioned in an appropriate passage provided in the tank bottom 12. The propelling charge support 14 may be made of synthetic material. For the purpose of reinforcement, it includes a punched metal disk 70 serving as armouring. The diameter of the metal disk 70 is equal to or larger than that of the propelling charge support 14.

In the metal disk 70, openings are provided as passages for the ignition pins 35 and the insulations thereof. The size of these openings can be reduced to the minimum of the distance required for insulating the ignition pins 35. During mounting, the propelling charge support 14 including the metal reinforcement 43 is pressed into a fit in the tank bottom 12 and fastened there by glueing, press-fit or other locks.

Figure 13:
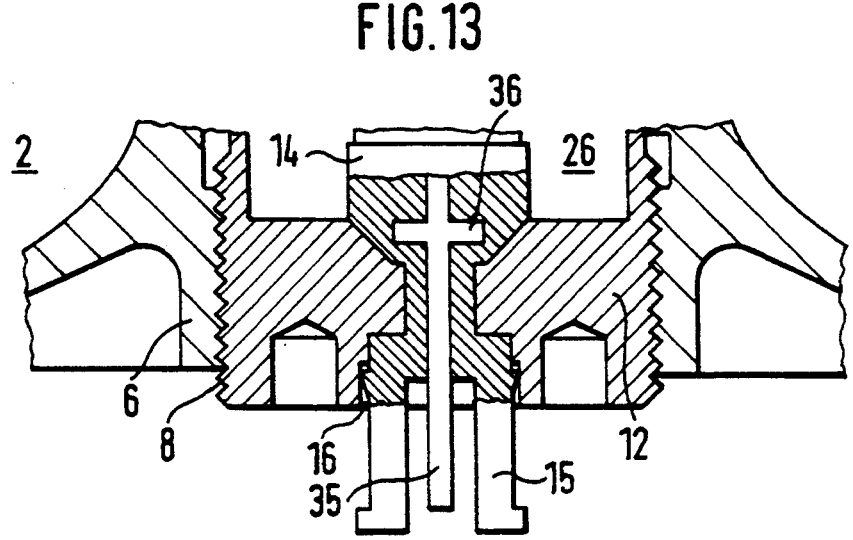

In order to prevent the ignition pins 35 from being pressed through at the enormous pressures, the ignition pins can be provided with vertically projecting or tapered swellings 36 (FIGS. 13 to 15). The ignition pins 35 including their swellings 36 are preferably manufactured as stampings.

When manufacturing the propelling charge support 14 as synthetic member, the ignition pins 35 and the metal reinforcement 70 can be simply injected together with the synthetic member.

Figure 12:
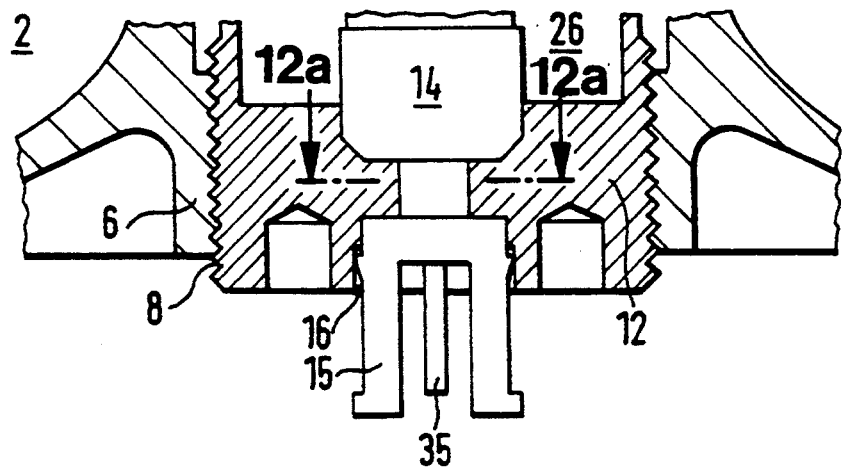
Figure 12A:
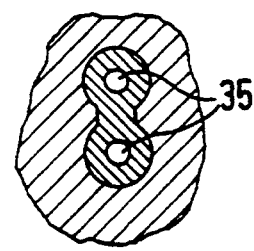
FIG. 12a is a cross section along lines 12a of FIG. 12.

Apart from that, also by appropriately shaping the propelling charge support 14, the latter can be prevented from being pressed through the tank bottom 12, as is represented e.g. in FIG. 12, but also in FIGS. 2, 3, 6, 8, 10 and 11.

FIG. 16 shows another embodiment of a toroidal pressure gas tank 2 whose central hole is adapted to a release means (not represented) or a tank insert for receiving the power gas chamber 26. The pressure gas tank 2 consists of two tank shells, namely an inner tank shell 72 and an outer tank shell 74. The two tank shells are welded at the top and at the bottom by two annular welds 9. The throttle element 38 is stationary in this case. The gas channels 18 and 37, the bursting seal 20 and the space of gas concentration 32 are again disposed in the manner of a multi-way valve. The bursting seal is formed in two pieces, however. Principally, it has the same shape as the bursting seals represented in the foregoing, but it consists of a lower part 20' directly facing the power gas outlet channel 37 and an upper part 20" positively connected thereto.

This bursting seal, too, has the same advantages as the above-described bursting seals 20. The sealing of the pressure gas tank 2 against the power gas chamber 26 and the gas concentration space 32 can be ensured to be absolutely safe by way of welds, preferably the laser welds 23 and 24. In addition, the opening of the pressure gas tank 2 and the power gas chamber 26 is effected simultaneously or can be regulated in a controlled manner, which is impossible, for instance, in the case of the U.S. Pat. No. 4,121,300 cited in the beginning, as there two spaced bursting disks are provided. It is ensured by the arrangement in the kind of a multi-way valve that no gas flows from the power gas chamber 26 into the pressure gas tank 2. Rather, the power gas flows exclusively into the space of gas concentration 32. Consequently, the pressure gas chamber 2 is not loaded with pressure peaks of the power gas. Therefore the bursting pressure of the bursting seal can have almost any value, at any rate it can by far exceed the pressure loading capacity of the pressure gas tank 2. This represents a great advantage as compared to DE-OS 23 48 834, where the heating charge first flows into the pressure gas tank.

The embodiment represented in FIG. 17 shows a safety system 1 which is preferably used as a front passenger system, as it is called, in a motor vehicle and is fastened there by means of a mounting device 80.

The pressure tank 2 does not have the shape of a torus here but that of a gas cylinder and is subdivided into plural chambers, namely the chambers 2', 2" and 2'''. For stabilizing the pressure tank 2, the tank bottom is designed in a way as it is known from wine bottles. The chambers 2' and 2" are separated by a partition 84'. The latter includes a predetermined breaking line 86' which is formed, for instance, as an annular recess. The predetermined breaking line 86' surrounds a bursting membrane 88'. The same applies analogically for the partition 84" provided between the chambers 2" and 2'''. The bursting membrane there is denoted with the reference numeral 88" and the predetermined breaking line with the reference numeral 86". The chamber 2' facing the gas outlet channel 18 is connected to a release and closing member via a weld 82. This release and closing member is substantially equipped like the central hole in the preceding embodiments. Also identical reference numerals have been used so that a detailed description is superfluous.

In this case, too, the gas outlet channels 18 and 37 form a multi-way valve together with the bursting seal 20 and the space of gas concentration 32. The hybrid gas generated in the space of gas concentration 32 flows via an elbow (not represented) into an air bag (likewise not represented).

In a non-operative state, an equal pressure is provided everywhere in the pressure gas tank 2. The partitions 84' and 84" are not exposed to any pressure load. If, however, the gas seal 20 is forced open, the pressure in the first pressure gas chamber 2' drops considerably. Consequently, a pressure difference is built up on both sides of the partition 84'. If this pressure difference has exceeded a predetermined bursting value, the bursting membrane 88' is breaking. The pressure gas contained in the second pressure chamber 2' is now escaping. After that, a pressure difference is built up on both sides of the second partition 84", until also the bursting membrane 88" is breaking.

The partitions 84′, 84″ may also include throttle openings (not represented) instead of or in addition to the bursting membranes 88′, 88″.

We claim:

1. Method for rapid inflation of at least one gas cushion in an air bag safety system, comprising the steps of
   storing in reservoirs at least two pressurized gases shielded from each other and from the outside with a rupture seal common to at least two reservoirs;
   releasing, upon need, the filling gases from their reservoirs;
   combining the filling gases essentially outside their reservoirs;
   inflating the gas cushion with the filling gas.

2. Method of claim 1, wherein the rupture seal is a multi-part seal and each part is connected to each other part in form-locking relationship.

3. Method of claim 1, wherein the rupture seal is a one piece seal.

4. Method of claim 1, comprising a further step of controlling at least two filling gas streams such that they arrive at a point of being combined essentially simultaneously.

5. Method of claim 4, wherein the controlling is accomplished with a multi-way valve.

6. Method of claim 1, wherein one reservoir stores a first compressed gas and the second reservoir stores an ignitable propellant charge.

7. Method of claim 6, comprising a step of controlling the pressure gradient of the propellant gas in the propellant charge reservoir, and in particular delaying the drop in the high-pressure stage.

8. Method of claim 7, comprising a further step of controlling the discharge of the propellant charge gas from the propellant charge reservoir, particularly in the direction of pressure conditions as uniform as possible at the point of combining the filling gas streams.

9. Method of claim 6, comprising the step of controlling the discharge of the first compressed gas in such a way that the first compressed gas flows out of the compressed gas reservoir in stages.

10. A safety system with a gas cushion of the air bag type which can be inflated rapidly comprising:
   a. at least two pressure reservoirs storing each pressurized filling gas;
   b. gas outlets which can be burst for releasing and combining the filling gases in a chamber located outside the pressure reservoirs inflating the gas cushion, wherein the
   c. gas outlets of at least two pressure reservoirs are sealed by a common rupture seal.

11. The safety system of claim 10, wherein the rupture seal is in one piece.

12. The safety system of claim 10, wherein the rupture seal comprises several parts connected in form-locking relationship.

13. The safety system of claim 11, wherein the chamber located outside the pressure reservoirs, the gas outlets leading into it and the rupture seal are arranged after the fashion of a multi-way valve.

14. The safety system of claim 10, wherein one pressure reservoir stores a compressed gas, and the other pressure reservoir stores an ignitable propellant charge to produce a propellant gas.

15. The safety system of claim 13, wherein:
   a. the compressed gas reservoir is essentially designed as a hollow ring;
   b. the propellant gas reservoir is essentially cup-shaped and arranged in a central hole surrounded by the compressed gas reservoir;
   c. the gas outlets of both reservoirs lead into the outer chamber located in the region of the central hole, wherein the propellant gas outlet projects from the propellant gas reservoir in the manner of a pipe fitting;
   d. the rupture seal comprises a disc-shaped element which covers the propellant and compressed gas outlets from the outside;
   e. the disc-shaped element is connected by a first peripheral predetermined break seam to the outer edge of the propellant gas outlet constructed as a pipe fitting, and in addition is connected by a second peripheral predetermined break seam to the outer wall of the compressed gas reservoir or a portion projecting therefrom.

16. The safety system of claim 15, wherein the disc-shaped element comprises two discs adjacent to each other in sandwich fashion, wherein the inner disc is connected by the first predetermined break seam to the propellant gas outlet and the outer disc is connected by the second predetermined break seam to the outer wall.

17. The safety system of claim 14, comprising means for controlling the pressure gradient of the propellant gas in the propellant gas reservoir and/or for controlling the interval of time ($\Delta t'$) between bursting of the rupture seal and exit of the propellant gas from the propellant gas reservoir.

18. The safety system of claim 17, wherein the control means further comprises a throttle element, arranged stationarily between the propellant charge and the point of gas exit from the propellant charge reservoir.

19. The safety system of claim 18, wherein the throttle element:
   a. has approximately the shape of a disc spanning the internal cross-section of the propellant charge reservoir, and
   b. has at least one throttle bore in the disc and/or in the peripheral surface of the hollow piston.

20. The safety system, according to claim 18, wherein:
   a. an end section of the throttle element already contacts the rupture seal in the inoperative position; and
   b. the stroke of the throttle element is limited to a value which ensures that the rupture seal breaks open reliably.

21. The safety system, according to claim 20, comprising stroke limiting means which at the end section of the throttle element after completion of the stroke movement is located outside the propellant gas outlet.

22. The safety system of claim 19, wherein stroke limiting means are located outside the propellant gas outlet.

23. The safety system of claim 17, wherein the throttle element is guided in the propellant gas outlet in such a way that the propellant gas can flow out only after completion of the stroke movement of the throttle element through a narrow flow channel between the peripheral surface of the throttle element and the inner wall of the propellant gas outlet.

24. The safety system of claim 10, wherein the compressed gas reservoir is divided into at least two chambers.

25. The safety system of claim 24, wherein:

a. the chambers are arranged one behind the other with respect to flow and in each case separated from each other by a means of a partition comprising a rupture membrane; and
b. the foremost chamber in the direction of flow comprises the compressed gas outlets.

26. The safety system of claim 14, wherein the propellant charge/primer composition support is protected by different cross-sectional shapes and/or a reinforcement from being pressed out of the propellant charge reservoir bottom.

27. The safety system of claim 26, wherein the propellant charge/primer composition support is made of plastic or plastic-like material and comprises on the inside a reinforcement as hard as metal, in particular a punched metal disc.

28. The safety system of claim 27, wherein the outer edge of the metal disc lies flush with the outer surface of the propellant charge/primer composition support.

29. The safety system of claim 26, having firing pins passing through the propellant/primer composition, which are protected by different cross-sectional shapes from being pressed out of the propellant charge/primer composition support after ignition of the propellant charge.

* * * * *